US008661159B2

(12) United States Patent
Nakai

(10) Patent No.: US 8,661,159 B2
(45) Date of Patent: Feb. 25, 2014

(54) IMAGE FORMING APPARATUS AND INFORMATION PROCESSING METHOD TO ACCESS UNIFORM RESOURCE IDENTIFIERS

(75) Inventor: Hironobu Nakai, Komae (JP)

(73) Assignee: Canon Kabushiki Kaisha, Tokyo (JP)

( * ) Notice: Subject to any disclaimer, the term of this patent is extended or adjusted under 35 U.S.C. 154(b) by 1736 days.

(21) Appl. No.: 11/399,910

(22) Filed: Apr. 7, 2006

(65) Prior Publication Data

US 2006/0235943 A1 Oct. 19, 2006

(30) Foreign Application Priority Data

Apr. 13, 2005 (JP) .................................. 2005-115908

(51) Int. Cl.
*G06F 15/16* (2006.01)
*G06F 15/173* (2006.01)
*G06F 3/12* (2006.01)
*G06K 15/00* (2006.01)

(52) U.S. Cl.
USPC .......... 709/245; 709/238; 358/1.14; 358/1.15; 715/208

(58) Field of Classification Search
USPC ........ 358/1.15, 1.2, 1.13, 1.14; 709/238, 245; 715/208
See application file for complete search history.

(56) References Cited

U.S. PATENT DOCUMENTS

| 5,502,577 | A | * | 3/1996 | Mackinlay et al. | 358/468 |
| 5,887,088 | A | * | 3/1999 | Kurokawa et al. | 382/317 |
| 6,035,308 | A | * | 3/2000 | Yano et al. | 715/201 |
| 6,041,360 | A | * | 3/2000 | Himmel et al. | 709/245 |
| 6,184,996 | B1 | * | 2/2001 | Gase | 358/1.15 |
| 6,348,970 | B1 | * | 2/2002 | Marx | 358/1.15 |
| 6,537,324 | B1 | * | 3/2003 | Tabata et al. | 715/205 |
| 6,546,393 | B1 | * | 4/2003 | Khan | 707/10 |
| 6,577,409 | B1 | * | 6/2003 | Barker et al. | 358/468 |
| 6,596,030 | B2 | * | 7/2003 | Ball et al. | 715/234 |
| 6,618,566 | B2 | * | 9/2003 | Kujirai et al. | 399/79 |
| 6,628,417 | B1 | * | 9/2003 | Naito et al. | 358/1.15 |
| 6,694,043 | B2 | * | 2/2004 | Seder et al. | 382/100 |
| 6,775,023 | B1 | * | 8/2004 | Fukunaga et al. | 358/1.15 |
| 6,778,289 | B1 | * | 8/2004 | Iwata | 358/1.15 |
| 6,782,430 | B1 | * | 8/2004 | Cragun | 709/245 |
| 6,791,703 | B1 | * | 9/2004 | Maeda et al. | 358/1.15 |

(Continued)

FOREIGN PATENT DOCUMENTS

JP H05-300355 A 11/1993
JP 07-095232 A 4/1995

(Continued)

*Primary Examiner* — Abdullahi Salad
*Assistant Examiner* — Wing Ma
(74) *Attorney, Agent, or Firm* — Canon USA, Inc., IP Division

(57) ABSTRACT

An image forming apparatus includes an obtaining unit configured to obtain an object that is stored in a location identified by a URI (uniform resource identifier) that is input, a printing unit configured to print the object that is obtained by the obtaining unit, a storage unit configured to store the URI, a determination unit configured to determine whether the URI that specifies a location in which the object is stored is changed from the URI that is stored in the storage unit, and an output unit configured to output a message for making an inquiry as to whether the URI that is stored in the storage unit is desired to be changed if it is determined by the determination unit that the URI is already changed.

7 Claims, 30 Drawing Sheets

(56) References Cited

U.S. PATENT DOCUMENTS

| | | | |
|---|---|---|---|
| 6,973,456 B1* | 12/2005 | Elgart | 707/10 |
| 6,981,210 B2* | 12/2005 | Peters et al. | 715/234 |
| 7,190,467 B2* | 3/2007 | Simpson et al. | 358/1.1 |
| 7,199,893 B2* | 4/2007 | Uchiyama et al. | 358/1.15 |
| 7,268,921 B2* | 9/2007 | Eguchi et al. | 358/402 |
| 7,382,505 B2* | 6/2008 | Lay et al. | 358/498 |
| 7,392,303 B2* | 6/2008 | Smith et al. | 709/223 |
| 7,401,067 B2* | 7/2008 | Sweet et al. | 707/2 |
| 7,401,287 B2* | 7/2008 | Suzuki | 715/208 |
| 7,475,345 B2* | 1/2009 | Ohara | 715/273 |
| 7,483,160 B2* | 1/2009 | Aoki et al. | 358/1.15 |
| 7,525,675 B2* | 4/2009 | Shelton et al. | 358/1.13 |
| 7,525,678 B2* | 4/2009 | Wiechers et al. | 358/1.15 |
| 8,122,099 B2* | 2/2012 | Kuwabara et al. | 709/218 |
| 2002/0030849 A1* | 3/2002 | Takamiya | 358/1.15 |
| 2002/0052889 A1* | 5/2002 | Shinoda | 707/500 |
| 2002/0114002 A1* | 8/2002 | Mitsubori et al. | 358/1.15 |
| 2002/0129164 A1* | 9/2002 | Van Der Meulen et al. | 709/239 |
| 2002/0186239 A1* | 12/2002 | Komuro | 345/738 |
| 2003/0007174 A1* | 1/2003 | Takagi et al. | 358/1.15 |
| 2003/0016387 A1* | 1/2003 | Takagi et al. | 358/1.15 |
| 2003/0123079 A1* | 7/2003 | Yamaguchi et al. | 358/1.15 |
| 2003/0158953 A1* | 8/2003 | Lal | 709/230 |
| 2004/0066530 A1* | 4/2004 | Wu et al. | 358/1.15 |
| 2004/0139391 A1* | 7/2004 | Stumbo et al. | 715/512 |
| 2006/0218643 A1* | 9/2006 | DeYoung | 726/26 |
| 2007/0078903 A1* | 4/2007 | Saito | 707/200 |

FOREIGN PATENT DOCUMENTS

| | | | | |
|---|---|---|---|---|
| JP | 2001-27318 A | * | 10/2001 | G06F 12/00 |
| JP | 2001-273185 A | | 10/2001 | |
| JP | 2001-357069 A | | 12/2001 | |
| JP | 2004-118774 A | | 4/2004 | |

* cited by examiner

FIG.8

TO: MR. XX OF YY CORPORATION　　CHANGE USER INFORMATION　　WELCOME TO CONSUMABLES ORDER PLACING WEB PAGE

SELECT MACHINE TYPE: ▼ GP405/355/315

★GP405/355/315

| TONER | | | GP300/400 SERIES TONER BLACK | 7,600 YEN (530 g × 1 p/BOX) | 1 ▶ PIECE(S) | 7,600 YEN |
|---|---|---|---|---|---|---|
| PLANE PAPER | PB PAPER | A3 | | 6,900 YEN (500 SHEETS × 3 BUNDLES) | 0 ▶ BOX(ES) | 0 YEN |
| | | A4 | | 5,750 YEN (500 SHEETS × 5 BUNDLES) | 0 ▶ BOX(ES) | 0 YEN |
| | | B4 | | 8,750 YEN (500 SHEETS × 5 BUNDLES) | 0 ▶ BOX(ES) | 0 YEN |
| | | B5 | | 4,500 YEN (500 SHEETS × 5 BUNDLES) | 0 ▶ BOX(ES) | 0 YEN |
| | WHITE RECYCLED PAPER EW-500 | A3 | | 7,500 YEN (500 SHEETS × 3 BUNDLES) | 2 ▶ BOX(ES) | 15,000 YEN |
| | | A4 | | 6,250 YEN (500 SHEETS × 5 BUNDLES) | 0 ▶ BOX(ES) | 0 YEN |
| | | B4 | | 9,500 YEN (500 SHEETS × 5 BUNDLES) | 0 ▶ BOX(ES) | 0 YEN |
| | | B5 | | 4,750 YEN (500 SHEETS × 5 BUNDLES) | 0 ▶ BOX(ES) | 0 YEN |
| RECYCLED PAPER | RECYCLED PAPER EN-500 | A3 | | 6,000 YEN (500 SHEETS × 3 BUNDLES) | 0 ▶ BOX(ES) | 0 YEN |
| | | A4 | | 5,000 YEN (500 SHEETS × 5 BUNDLES) | 0 ▶ BOX(ES) | 0 YEN |
| | | B4 | | 7,500 YEN (500 SHEETS × 5 BUNDLES) | 0 ▶ BOX(ES) | 0 YEN |

CURRENT TOTAL AMOUNT: 22,600 YEN

[TO ORDER PLACING FORM PAGE] — 801
[PRINT PREVIEW] — 802
[PRINT] — 803

TO: Ms. XXX, ACCOUNTANT,
ZZZ SECTION, YYY CORPORATION

LETTER OF ORDER ACCEPTANCE

DEAR Ms. XXX

THANK YOU VERY MUCH FOR YOUR REQUEST DATED DDD MMM, YYY FOR OUR PRODUCT.
WE INFORM YOU THAT WE HAVE SHIPPED THE PRODUCT AND THAT THE PRODUCT IS GOING TO ARRIVE AT YOUR OFFICE ON DDD MMM, YYY.
WE HOPE THAT YOU WILL KEEP INTERESTED IN OUR PRODUCTS.

SINCERELY,
(NAME OR THE PERSON-IN-CHARGE) OF XYZ SECTION
ABC CORPORATION

NOTE

| NAME OF PRODUCT | QUANTITY | UNIT PRICE |
|---|---|---|
| ****** | *** | ¥***− |
| ****** | *** | ¥***− |
| ****** | *** | ¥***− |
| ****** | *** | ¥***− |
| ****** | *** | ¥***− |
| ****** | *** | ¥***− |
| ****** | *** | ¥***− |

END OF LETTER

[ CLOSE ] [ PRINT ]—901 [ PREVIOUS ← ] [ NEXT → ]

FIG.30
URL REGISTRATION
MANAGEMENT REPORT
PRODUCTION
DATE/TIME: NOV. 8, 2004, 13:21
EFFECTIVE
THROUGH: NOV. 12, 2004 13:21
DEVICE NAME: iR5000-D4FW
USER NAME: TARO YAMADA
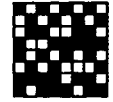
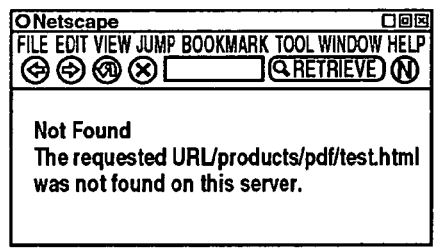
CURRENT STATUS
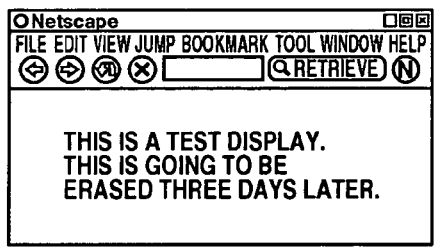
AS OF OCT. 8, 2004, 13:21
■ ERASE THE BOOKMARK?
  IF DESIRED, PAINT
  THE RIGHT COLUMN.
 — 3001
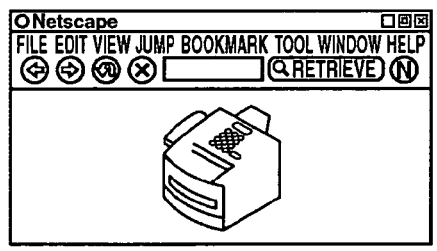
CURRENT STATUS
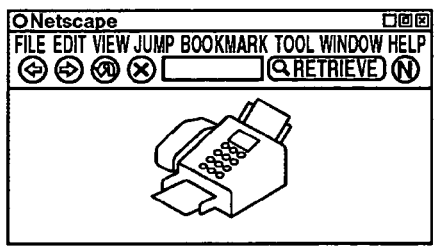
AS OF NOV. 2, 2004, 12:34
■ UPDATE THE BOOKMARK?
  IF DESIRED, PAINT
  THE RIGHT COLUMN.
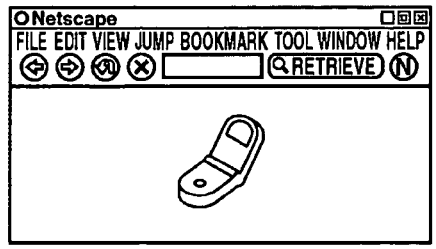
CURRENT STATUS
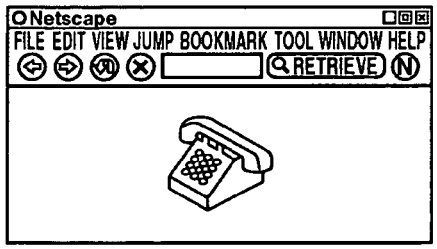
AS OF JAN. 23, 2004, 01:23
■ UPDATE THE BOOKMARK?
  IF DESIRED, PAINT
  THE RIGHT COLUMN.
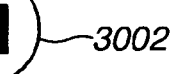 — 3002

IMAGE FORMING APPARATUS AND INFORMATION PROCESSING METHOD TO ACCESS UNIFORM RESOURCE IDENTIFIERS

BACKGROUND OF THE INVENTION

1. Field of the Invention

The present invention relates to technology for processing information in an image forming apparatus that is connected to a network for communication. More specifically, the present invention relates to a technology for processing information in an image forming apparatus that is provided with a WWW (world wide web) browser (hereinafter referred to as a browser) function for receiving and displaying a file that is described in an HTML (hyper text markup language) format or the like sent through the network.

2. Description of the Related Art

Recently, with the development of functions applied to image forming apparatuses, most image forming apparatuses are provided with a browser function. The browser function enables a user to instruct such apparatus to display and print an HTML document. In addition, the browser function enables the user to obtain data such as PDF (portable document format), TIFF (tagged image file format), and the like, and to specify a desired document to directly print the same. Further, with the browser function, the user can recall and utilize a web application through an operation panel of the image forming apparatus.

In order to specify positions (locations of storage) of various types of objects (the HTML document and the like) that exist on the network, it is generally necessary to describe URL (uniform resource locator) information (or a path to a document file: collectively referred to as a URI (uniform resource identifier). However, it is too much of a bother for the user that the user needs to input and describe a long URL on every occasion in the image forming apparatus. This is because the image forming apparatus is seldom provided with a keyboard as hardware, unlike a common PC, and thus the user needs to operate a software keyboard that is displayed on the operation panel.

In this regard, as a method for decreasing a burden or a trouble of an operation for inputting a URL, the image forming apparatus is introduced with a function such as a "bookmark" registration function or a "favorite" registration function. The function allows the browser to store in the browser the URL that the user frequently uses as a shortcut. With the function, the user can, once the user inputs a URL through the operation panel and confirms a display on the browser, readily browse a desired object without inputting the URL again for a next occasion or thereafter.

Further, recently, a technology is proposed, as a function for registering the "bookmark", such that a keyword for retrieval is extracted from an arbitrary area of a page that is displayed at the time of registration of a URL of the page that is an object of a link, and the URL is stored together with the keyword. In the case of linkrot, the URL is retrieved based on the extracted keyword, and thus a list of URLs of links that include the extracted keyword is displayed (see, for example, Japanese Patent Application Laid-Open No. 2001-273185).

However, although the "bookmark" registration function is convenient at a glance, there are some drawbacks. For example, in this function, URL information is only statically stored in the browser as the shortcut of the URL at the time the user specifies the URL (for example, http://www.ab.co.jp/2004-12-01/index.html, and the like). Accordingly, if the URL information of the object that is located on the network is once changed, with the lapse or time, the URL whose link is broken is left as it is.

Of course, it is sufficient that all the users who use browsers arrange bookmark information on a periodic basis so that the plenty of registered bookmark information is updated. However, it is not likely that the user should arrange the bookmark information on every occasion of use of such function by using the browser function installed to the image forming apparatus.

As a result, the URL information that cannot already be used is left as it is without being subjected to a maintenance. Thus, effective URL information and ineffective URL information exist at the same time in a mixture, and thus a convenience of the bookmark registration function is degraded.

In addition, in the case of the browser function installed to the image forming apparatus, unlike a browser operating in a common and general PC, the function is subjected to restrictions related to a usable non-volatile memory and a maximum capacity of the non-volatile memory. Accordingly, a maximum amount of information that can be registered to "bookmark" is limited. Therefore, in order to effectively use the memory that has such restrictions, it is necessary to avoid continuing storage of the bookmark information that is already ineffective, when possible.

SUMMARY OF THE INVENTION

The present invention is directed to an improvement in convenience of a user in using a shortcut function in an image forming apparatus that is installed with a browser having the shortcut function for allowing the user to easily access a URI by previously registering predetermined URI information.

In one exemplary embodiment of the present invention, an image forming apparatus includes an obtaining unit configured to obtain an object that is stored in a location identified by a URI (uniform resource identifier) that is input, a printing unit configured to print the object that is obtained by the obtaining unit, a storage unit configured to store the URI, a determination unit configured to determine whether the URI that specifies a location in which the object is stored is changed from the URI that is stored in the storage unit, and an output unit configured to output a message for making an inquiry as to whether the URI that is stored in the storage unit is desired to be changed if it is determined by the determination unit that the URI is already changed.

In another exemplary embodiment of the present invention, an image forming apparatus includes an obtaining unit configured to obtain an object that is stored in a location identified by a URI (uniform resource identifier) that is input, a printing unit configured to print the object that is obtained by the obtaining unit, a storage unit configured to store the URI, a determination unit configured to determine whether the object exists in a location specified by the URI that is stored in the storage unit, and an output unit configured to output a message for making an inquiry as to whether the URI that is stored in the storage unit is desired to be erased if it is determined by the determination unit that the URI does not exist.

In yet another exemplary embodiment of the present invention, an image forming apparatus that is provided with a browser for displaying an object that is received via a network includes a storage unit configured to store a URI (uniform resource identifier) that corresponds to an object displayed by using the browser, a determination unit configured to determine whether the URI that is stored in the storage unit is effective, a printing unit configured to print a report that expresses that the URI is not effective if the URI is determined by the determination unit to be not effective, a reading unit configured to read a report that instructs whether the URI that is expressed by the report printed by the printing unit is desired to be erased or updated, and a control unit configured to allow an erasure or an updating of the URI to be executed in accordance with an instruction expressed by the report read by the reading unit.

Further features and aspects of the present invention will become apparent from the following detailed description of the numerous exemplary embodiments with reference to the attached drawings.

BRIEF DESCRIPTION OF THE DRAWINGS

The accompanying drawings, which are incorporated in and constitute a part of the specification, illustrate numerous embodiments, features and aspects of the invention and, together with the description, serve to explain the principles of the invention.

FIG. 8 is a diagram that shows one example of an order-through-the-web page form.

FIG. 9 is a diagram that shows one example of an order form print preview screen.

FIG. 30 is a diagram that shows one example of a result of a marking made by the user in outputting a report, in order to read the report from the scanner unit 291 to update URL registration information.

DETAILED DESCRIPTION OF THE EMBODIMENTS

Numerous exemplary embodiments, features and aspects of the present invention will now herein be described in detail with reference to the drawings. It should be noted that the relative arrangement of the components, the numerical expressions and numerical values set forth in these embodiments are not intended to limit the scope of the present invention unless it is specifically stated otherwise.

First Exemplary Embodiment

Figure 1:
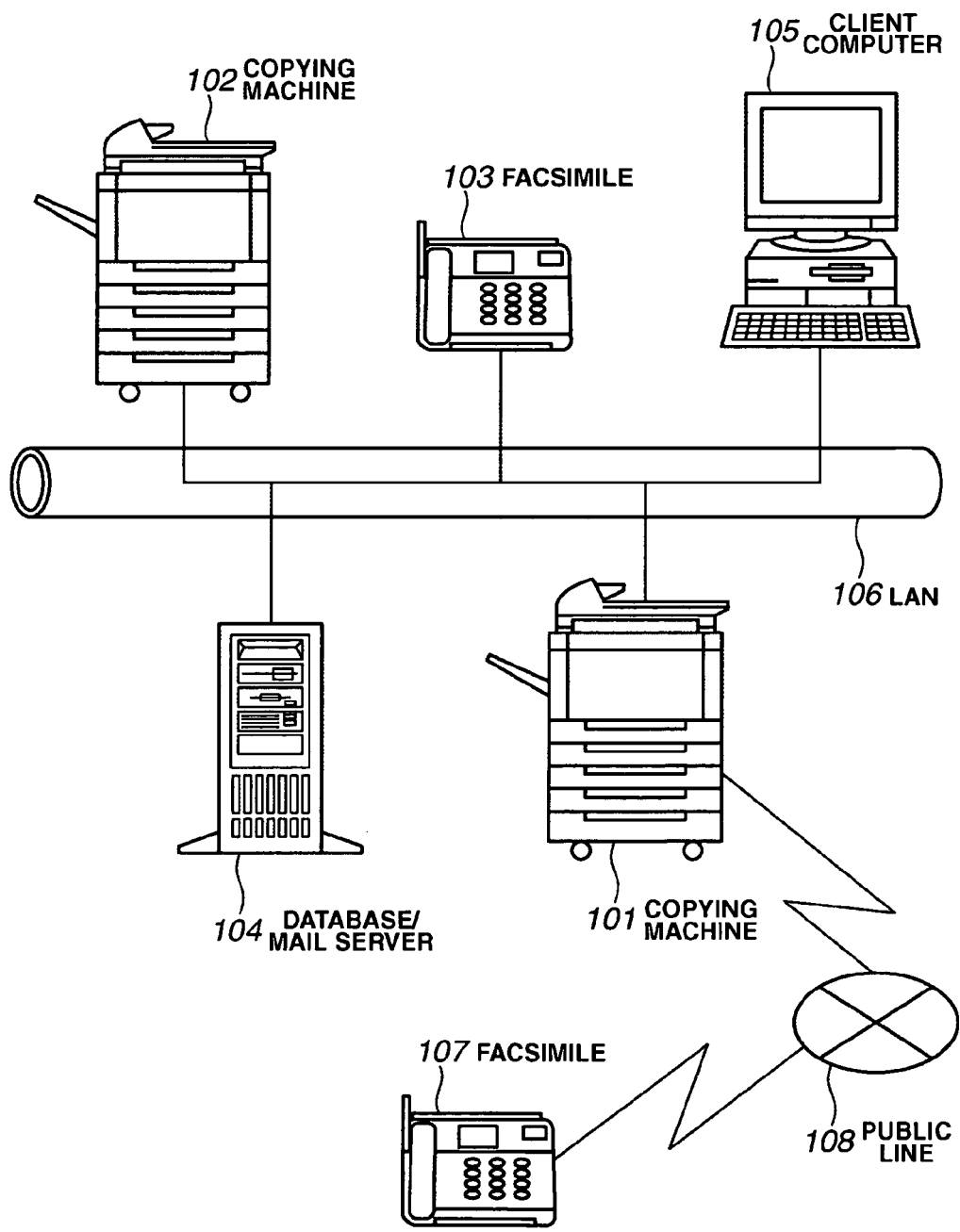
FIG. 1 is a diagram that shows one example of a configuration of a network that is provided with an image forming apparatus-according to a first embodiment of the present invention.

FIG. 1 is a diagram that shows an example of a configuration of a network that is provided with an image forming apparatus according to a first embodiment of the present invention. In this embodiment, an explanation is made as to a "copying machine", for example, that is a multi-function apparatus provided with a data transmission function as an image forming apparatus.

The copying machine 101, as shown in FIG. 1, can be used by being connected to a LAN 106 constituted by an Ethernet and the like, together with a copying machine 102 having the same function as that of the copying machine 101, a facsimile 103, a database/mail server 104, and a client computer 105. In addition, the copying machine 101 can be used by being connected to a public line 108, together with a facsimile 107.

In addition, the copying machine 101 is provided with a copying function and a facsimile function, and also a network function for reading an original image and sending data of the read image to each device on the LAN 106. Further, the copying machine 101 is provided with a PDL (page description language) function, and is capable of receiving and printing a PDL image that is instructed from the client computer 105 and the like connected to the LAN 106.

In addition, the copying machine 101 is provided with a box function for storing an image read by the copying machine 101 and the PDL image instructed from the client computer 105 and the like connected to the LAN 106 into a specified box area of a hard disk (HDD) 204 (to be described later below), and is also capable of printing the image stored in the box.

Further, the copying machine 101 is capable of receiving the data read by the copying machine 102 via the LAN 106 and storing the received data into the copying machine 101 and printing out the received data into the HDD 204. In addition, the copying machine 101 is capable of receiving the image stored in the database/mail server 104 via the client computer 105 and the LAN 106 and storing the image into the copying machine 101 and printing out the image.

The facsimile 103 is capable of receiving the data read by the copying machine 101 via the LAN 106 and sending the received data. The database/mail server 104 is capable of receiving the data read by the copying machine 101 via the LAN 106, storing the read data into the database, and sending the stored data as an electronic mail. The facsimile 107 is capable of receiving the data read by the copying machine 101 via the public line 108 and printing out the received data.

The client computer 105 is connected to the database/mail server 104, and is capable of obtaining and displaying desired data from the database/mail server 104. In addition, the client computer 105 is capable of receiving the data read by the copying machine 101 via the LAN 106 and processing and editing the received data.

Figure 2:
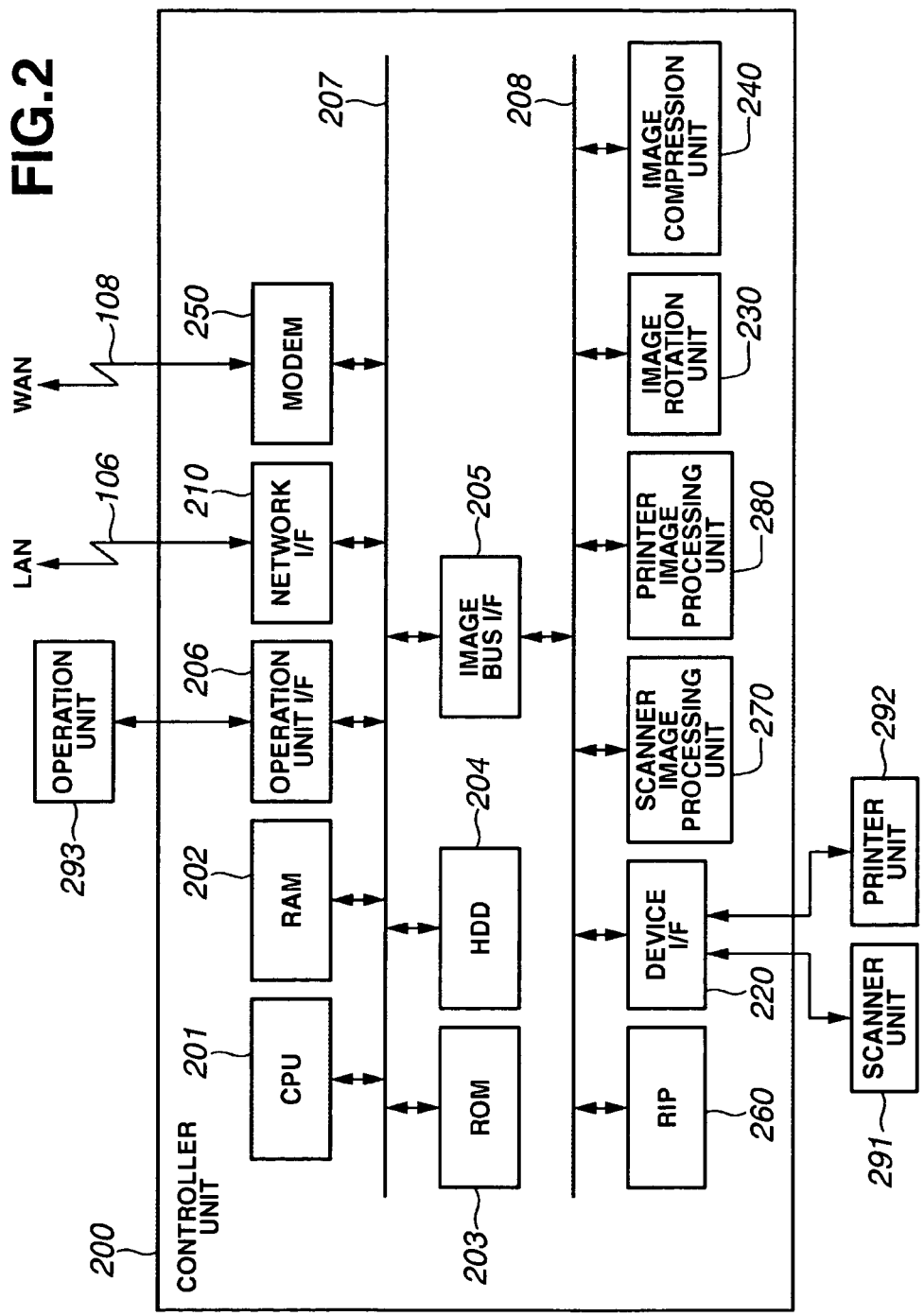
FIG. 2 is a block diagram that shows an exemplary configuration of a portion of a copying machine.

FIG. 2 is a block diagram that shows an exemplary configuration of a portion of a copying machine 101. In FIG. 2, a controller unit 200 performs a control for implementing a copying function in which a scanner unit 291 and a printer unit 292 that is an image output device are mutually connected and in addition, and image data read by the scanner unit 291 is printed out by the printer unit 292. In addition, the copying machine 101, which is connected to the LAN 106 and the public line (WAN) 108, performs a control for inputting/outputting image information and device information.

The controller unit 200 is provided with a CPU 201. The CPU 201 activates an operation system (OS) by using a boot program stored in a ROM 203 and performs various kinds of processing by executing an application program (including a program for implementing the copying function, a program for implementing a sending/fax function, a box function, a web browser function, and a program for implementing the network function for sending/receiving data between external devices) stored in the HDD 204, on the OS. For a work area of the CPU 201, a RAM 202 is used. The RAM 202 provides the work area and an image memory area for temporarily storing the image data. The HDD 204 stores the application program and the image data.

There are connected to the CPU 201, via a system bus 207, the ROM 203, the RAM 202, an operation unit I/F (operation unit interface) 206, a network I/F (network interface) 210, a modem 250, and an image bus I/F (image bus interface) 205. The operation unit I/F 206 is an interface with the operation unit 293 that has a touch panel, and outputs the image data to be displayed in the operation unit 293 to the operation unit 293. In addition, the operation unit I/F 206 sends information input by the user through the operation unit 293 to the CPU 201.

The network I/F 210 is connected to the LAN 106, and inputs/outputs information between each device on the LAN 106 via the LAN 106. The modem 250 is connected to the public line 108, and inputs/outputs information via the public line 108. The image bus I/F 205 connects the system bus 207 with an image bus 208 that transmits the image data at a high speed, and is a bus bridge for converting data configuration. The image bus 208 is constituted by a PCI bus or an IEEE 1394 bus. The image bus 208 is provided with a raster image processor (hereinafter referred to as an RIP) 260, a device I/F 220, a scanner image processing unit 270, a printer image processing unit 280, an image rotation unit 230, and an image compression unit 240.

The RIP 260 is a processor for rasterizing PDL code into a bit map image. The device I/F 220 is provided with the scanner unit 291 and the printer unit 292 connected thereto, and the device I/F 220 performs a conversion between synchronous image data and asynchronous image data. The scanner image processing unit 270 corrects, processes, and edits input image data. The printer image processing unit 280 performs, with respect to the image data to be printed out, a correction and a conversion of a resolution by the printer.

The image rotation unit 230 rotates the image data. The image compression section 240 compresses multilevel image data into JPEG (joint photographic experts group) data and binary image data into data such as JBIG (joint bi-level image experts group), MMR (modified modified READ), MH (modified Huffman), and the like, and carries out decompression processing of the compressed data.

Figure 3:
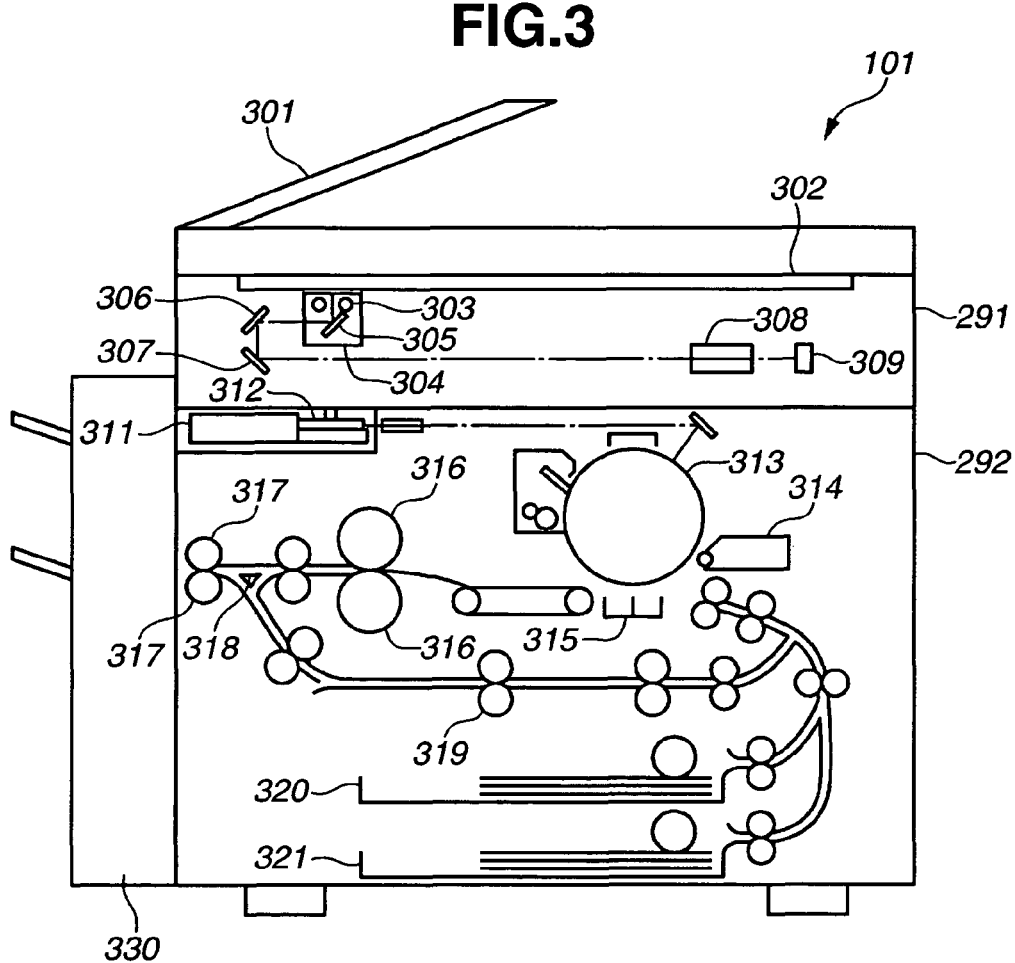
FIG. 3 is a schematic diagram that shows an exemplary hardware configuration of a scanner unit and a printer unit of the copying machine.

FIG. 3 is a schematic diagram that shows an exemplary hardware configuration of a scanner unit 291 and a printer unit 292 of the copying machine 101. The scanner unit 291 and the printer unit 292 are integrally constituted, as shown in FIG. 3. The scanner unit 291 is installed with an original feeding unit 301. The original feeding unit 301 feeds an original onto a platen glass 302 sheet by sheet in order from a top page and discharges the original from the platen glass 302 to a discharge tray (not shown) every time an operation for reading each of the sheets of the original is completed.

The scanner unit 291 turns on a lamp 303 when the original is fed onto the platen glass 302 and then starts the movement of a moving unit 304. The original on the platen glass 302 is read and scanned by the movement of the moving unit 304. During the reading and scanning, light reflected from the original is guided to a CCD (charge coupled devices) image sensor 309 via mirrors 305, 306, and 307 and a lens 308, and the image on the original is formed on an imaging surface of the CCD image sensor (hereinafter simply referred to as CCD) 309. The CCD 309 converts the image formed on the imaging surface into an electric signal, and the converted electric signal is input to a control device 200 (not shown in FIG. 3) after being subjected to prescribed processing.

The printer unit 292 is provided with a laser driver 311. The laser driver 311 drives a laser beam emitting unit 312 on the basis of the image data input from the control device. Thereby, a laser beam in accordance with the image data is emitted from the laser beam emitting unit 312, and the laser beam is irradiated onto a photosensitive drum 313 while being scanned.

An electrostatic latent image is formed on the photosensitive drum 313 by the irradiated laser beam, and the electrostatic latent image is visualized as a toner image by a toner supplied from a developing device 314. A recording paper sheet is fed from a cassette 320 or 321 via a conveyance path into a portion between the photosensitive drum 313 and a transferring unit 315. The toner image on the photosensitive drum 313 is transferred onto the recording paper sheet fed by the transferring unit 315.

The recording paper sheet onto which the toner image is transferred is fed to a pair of fixing rollers (a heating roller and a pressure roller) 316. The pair of fixing rollers 316 heats and presses the recording paper sheet and fixes the toner image on the recording paper sheet to the recording paper sheet. The recording paper sheet that passes the pair of fixing rollers 316 is discharged to a paper discharge unit 330 by a pair of discharge rollers 317.

The paper discharge unit 330 is constituted by a sheet processing device capable of carrying out post-processing such as sorting, stapling, and the like. In addition, in a case where a two-sided recording mode is set, a direction of rotation of the pair of discharge rollers 317 is reversed after the recording paper sheet is conveyed to the pair of discharge rollers 317, and the recording paper sheet is guided to a re-feed conveyance path 319 by a flapper 318. The recording paper sheet guided to the re-feed conveyance path 319 is re-fed to the portion between the photosensitive drum 313 and the transferring unit 315 at the timing mentioned above, and a toner image is transferred on a back surface of the recording paper sheet.

Figure 4:
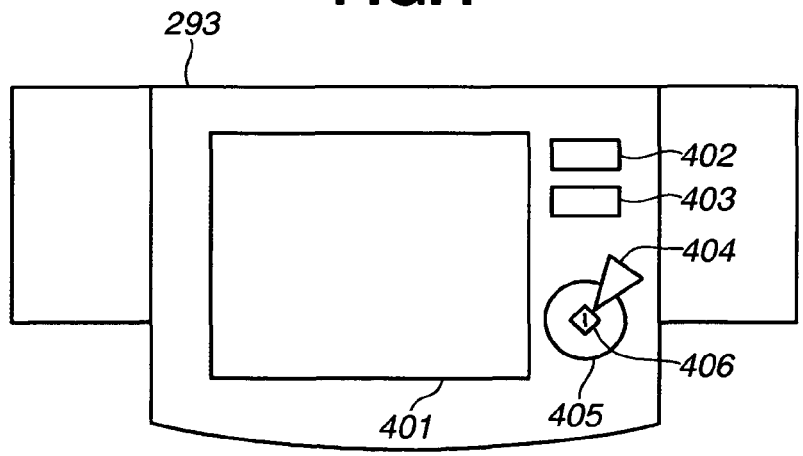
FIG. 4 is a diagram that shows an exemplary configuration and an external appearance of an operation unit.

FIG. 4 illustrates an exemplary configuration of the operation unit 293. An LCD display unit 401 has a configuration such that a touch panel sheet is attached onto an LCD. The LCD display unit 406 displays an operation picture of the copying machine 101 and, when a key displayed on the picture is pushed down, transmits positional information of the key to the CPU 201 of the controller unit 200. A start key 405 is used at the time of start of the operation for reading the original image and the like, via the scanner unit 291. In a center portion of the start key 405, there are provided light-emitting diodes (LEDs) 406 of two colors of green and red. The color of the LEDs 406 indicates whether the start key 405 is in a usable state or not. A stop key 404 is operated at the time of stopping the operation currently in operation. An ID key 403 is used at the time of inputting a user ID of the user. A user mode key 402 is used at the time of performing the setting through the operation screen displayed by the LCD display unit 401.

Figure 5:
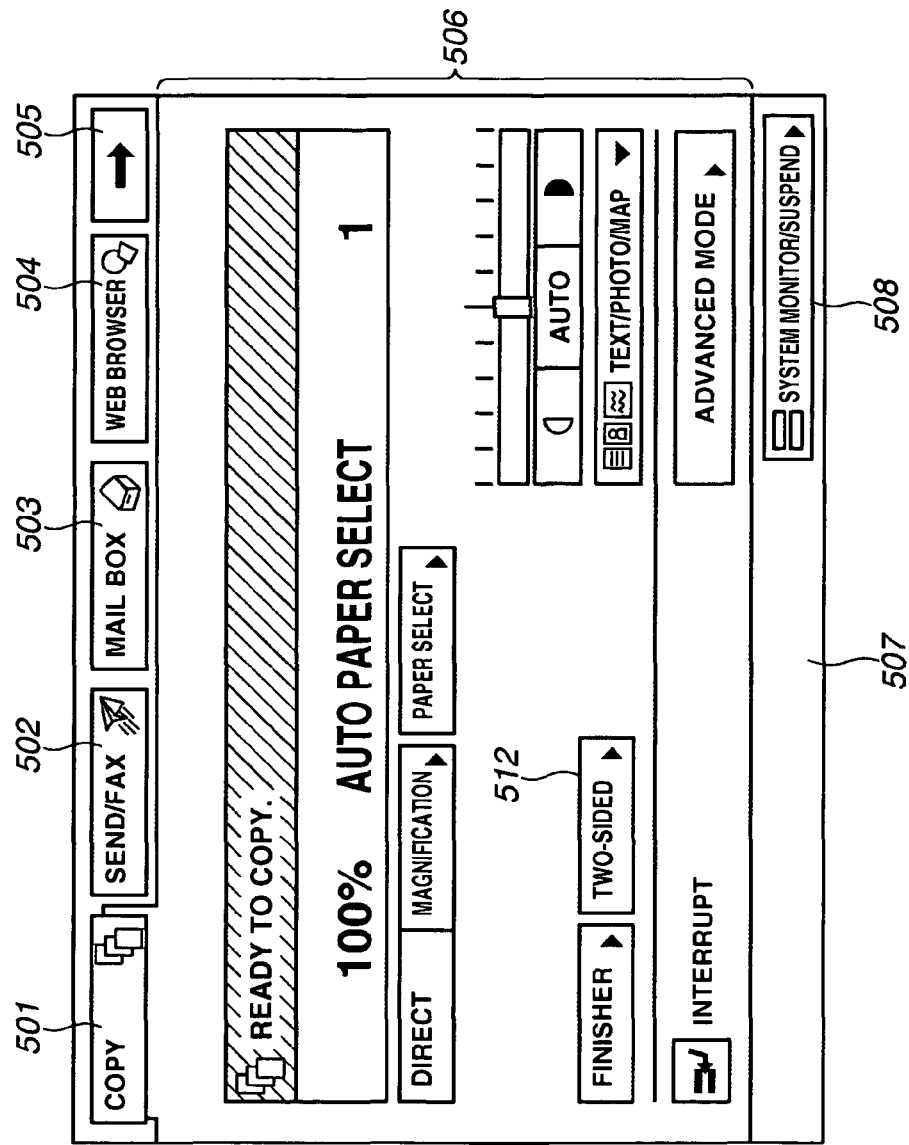
FIG. 5 is a diagram that shows one example of an operation screen that is displayed on an LCD display unit of the operation unit.

FIG. 5 is a diagram that shows one example of an operation screen that is displayed on an LCD display unit 401 of the operation unit 293. In an upper portion of the operation screen, a plurality of touch keys, which are represented in a form of a tab per each of the plural functions, such as a Copy key 501, a Send/FAX key 502, a Box key 503, a Browser key 504, are displayed.

Note that FIG. 5 shows an initial screen of the copying function when the touch key of the Copy key 501 is pressed. As shown in FIG. 5, in the initial screen 506 of the copying function, a status message of "Ready to Copy." indicating that the copying function can be executed, in an upper portion of the initial screen 506. In a lower portion of the initial screen 506, the magnification, the size of a paper sheet to be selected, a magnification, a selected sheet feeding stage, and a number of copies to make are displayed.

In addition, for the touch keys for setting an operation mode of the copying function, a Direct key, a Zoom Ratio key, a Paper Select key, a Finisher key, a Two-Sided key 512, an Interrupt key, a Text/Photo/Map key, a left arrow key corresponding to a "Thinning" function for density adjustment, a right arrow key corresponding to a "Thickening" function for density adjustment, and an "Auto" key for automatically adjusting the density are displayed on the screen. Note that for an instruction of operation modes that cannot be displayed in the initial screen, a setting screen therefor is hierarchically displayed in the initial screen by pressing an "Advanced Mode" key.

In addition, a display area 507 is an area for displaying the status of the copying machine 101. More specifically, the display area 507 is an area for displaying an alarm message indicating jamming and the like and a status message indicating that a PDL printing is being carried out when the PDL printing is currently carried out, for example. In the display area 507, a System Monitor/Suspend touch key 508 is displayed. When the System Monitor/Suspend touch key 508 is pressed, the screen displaying the device information of the copying machine 101 and a screen displaying a print job status (not shown) are displayed. By using this screen, it is possible to suspend the job.

When the Send/FAX key 502 is pressed, a setting screen (not shown) for sending the image read by the copying machine 101 to a device on the LAN 106 by e-mail or FTP is displayed. In addition, through the setting screen, the read image can be sent by a facsimile by using the public line 108. When the Box key 503 is pressed, a setting screen (not shown) for storing (registering) the image read by the copying machine 101 into the box area in the HDD 204, specifying the image data stored in the box area for printing, and sending the image data to a device on the LAN 106 is displayed. In addition, in a case where five or more functions are installed in the controller unit 200, a right arrow key 505 is displayed to the right including the four function keys for Copy, Send/Fax, Box, and Browser.

In the copying machine 101 according to this embodiment, in registering the URL information as a shortcut, two methods for registration can be used. In this regard, a first method for registration is a method in which the "Favorite" function in the web browser function is used. In addition, a second registration method is a method in which the URL information is registered as a "system administration setting" in a user mode. In this regard, in the first method, the URL information is registered in correspondence with a user ID input at the time of use of the web browser function, and on the other hand, in the second registration method, the URL information is registered in common to all users, regardless of the user ID. Hereinbelow, each registration method is explained in detail.

Hereinbelow, an explanation is made as to one example of a method of using the "Favorite" function in the web browser function that is executed upon pressing of the Web Browser key 504. First, the explanation is made as to an exemplary web browser initial screen, with reference to FIG. 6. When the Web Browser key 504 is pressed in a state of the operation screen as shown in FIG. 5, the web browser initial screen as shown in FIG. 6 is displayed.

Figure 6:
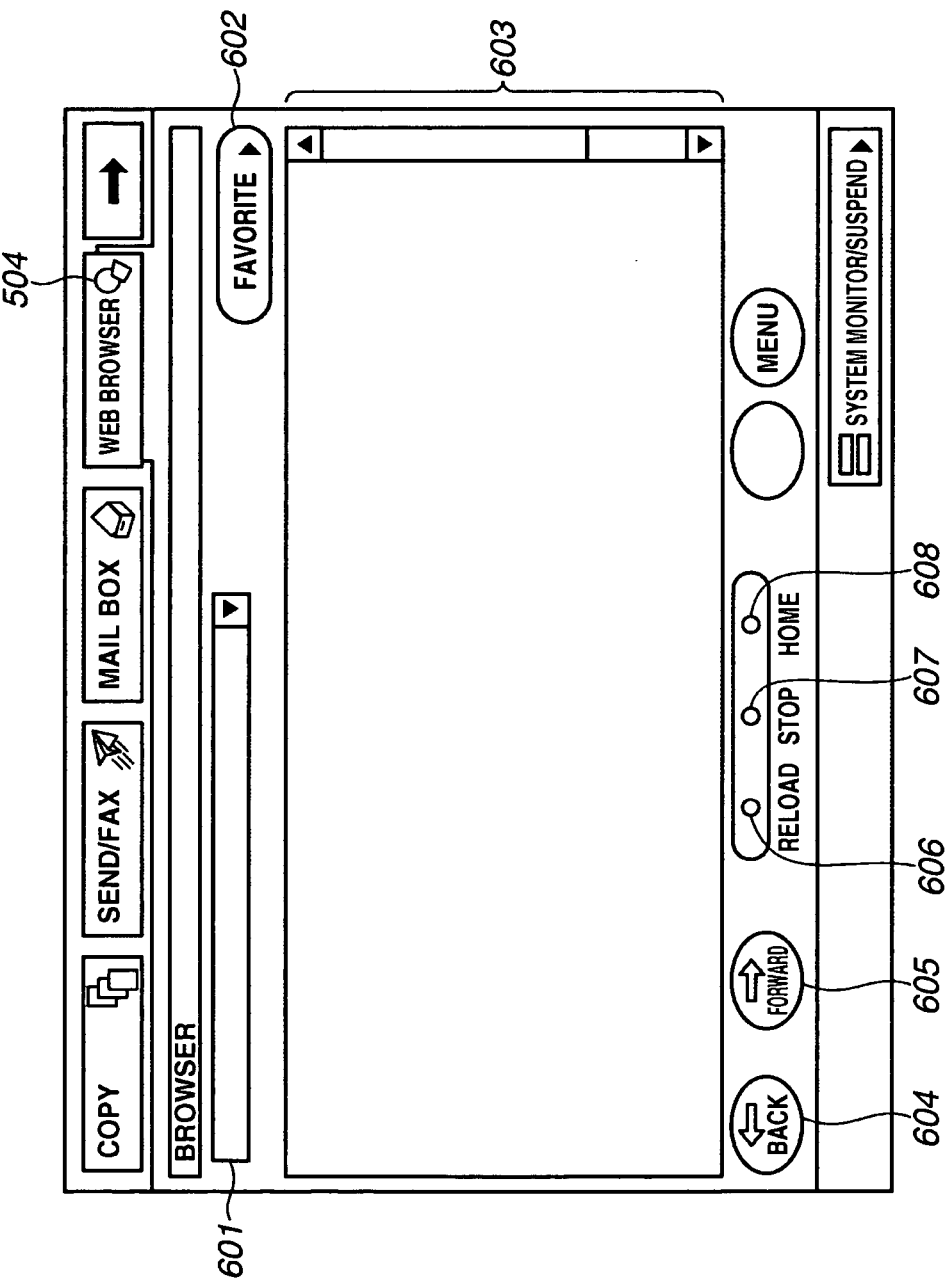
FIG. 6 is a diagram that shows one example of a startup screen of a web browser
Figure 7:
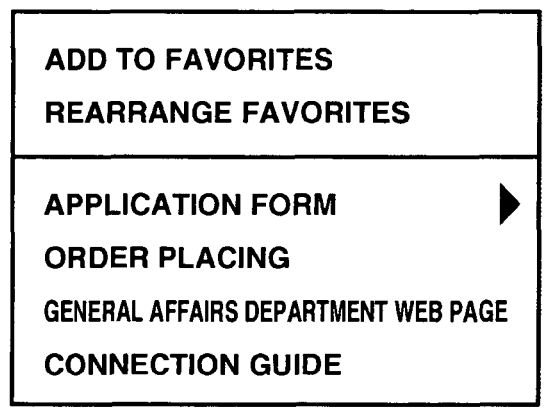
FIG. 7 is a diagram that shows one example of a "Favorite Menu".

In the web browser initial screen as shown in FIG. 6, reference numeral 601 denotes an entry field for inputting the URL, and the user can input the desired URL in the entry filed 601. Reference numeral 602 denotes the "Favorite" key, to which the URL information the user desires is registered. By pressing the "Favorite" key 602, the "Favorite Menu" key as shown in FIG. 7 is displayed. Note here that for the "Favorite Menu", an "Order Form", "Order Placing", "General Affairs Department web page", and "Connection Guide" are registered.

Still referring to FIG. 6, reference numeral 603 denotes a display area. The display area 603 displays the URL information input in the URL entry field 601 or an object (content) that is accessed by the user based on the information selected by using the "Favorite Menu" (see FIG. 7). Reference numerals 604 and 605 respectively denote a "Back" key and a "Forward" key. By pressing the key 604 or 605, the content that is displayed in one previous page or in one subsequent page of the content that is currently displayed in the display area 603. Reference numeral 606 denotes a Reload key for reloading the content that is currently displayed in the display area 603 as a home URL. Reference numeral 607 denotes a Stop key for stopping an access to the URL, and reference numeral 608 denotes a Home key for displaying the content of the URL registered as the home URL.

Next, an explanation is made as to how the "Favorite" function is used. When the Favorite key 602 is pressed in the web browser initial screen as described above, the Favorite Menu as shown in FIG. 7 is displayed. Here, the Order Placing key is selected. The Order Placing key is allocated with the URL of a consumables order receiving center. When the Order Placing key is selected, the web browser connects to a predetermined consumables order receiving center after effecting a user authentication.

When the user is authenticated, an order-placing web page (FIG. 8) is displayed in the display area 603. The user, using a form as shown in the order-placing web page as shown in FIG. 8, sets a number of necessary consumables, and places an order. When a "To Order Placing Form Page" key 801 is pressed, a confirmation screen for confirming a destination (an address of a receiver of the consumables) and costs and fees (the screen is not shown in the drawing) is displayed, and thus the order placement is finalized.

In addition, when "Print Preview" key 802 is pressed, an order placing form print preview screen as shown in FIG. 9 is displayed. By using the order placing form print preview screen, the user confirms whether there is an error in the content to be printed, and when the user presses a Print key 901, a print setting dialog (not shown) is displayed. In the print setting dialog, a content of a setting as to how a frame be printed, and as well, setting items related to the printing (including a number of copies to be printed, two-sided, and sorting) are displayed. Then, when a Start Printing key shown in the screen is pressed, the printing starts. Note that when the "Print" key 803 as shown in FIG. 8 is pressed, in the same way, the print setting dialog is displayed. When the Start Printing key shown in the screen is pressed, the printing starts.

Next, an explanation is made as to a case where the "Order Form" key is selected for the "Favorite Menu" (FIG. 7). "Order Form" key is a folder, and the URL or a path indicating a location of storage of order placement document file necessary for the work is registered thereto. Here, when the URL or the path is selected, the order placement document file is displayed. The displayed file can be printed as necessary.

Thus, when the web browser is utilized, a PC is not necessary for outputting the document, and in addition, this is a method in which the data is not directly stored in the HDD 204, and thus the area in the HDD 204 is not unnecessarily used.

Figure 10:
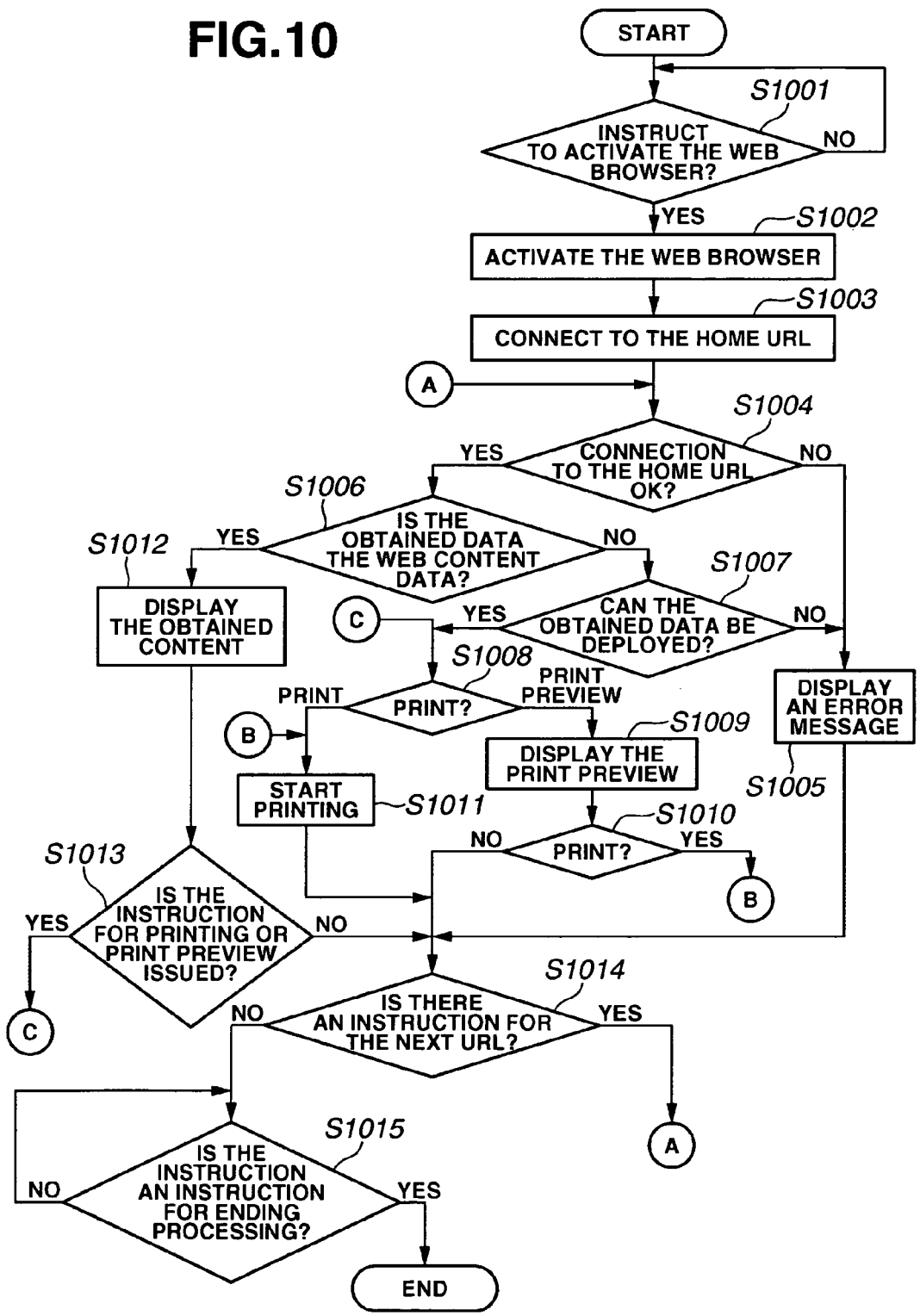
FIG. 10 is a flow chart that shows an exemplary flow of processing related to a web browser function of the copying machine.

FIG. 10 is a flow chart that shows a flow of exemplary processing related to a web browser function of the copying machine 101. The basic operation in the web browser function is explained with reference to the flow chart shown in FIG. 10. In step S1001, a determination is made as to whether there is an instruction for starting up the web browser (whether the web browser key 504 is pressed). If it is determined that there is an instruction for starting up the web browser, the processing advances to step S1002 and activates the web browser. Then, the processing performs a connection to the URL to be connected upon activation of the web browser (namely, the home URL) (step S1003). In step S1004, a determination is made as to whether the connection to the home URL is established. If it is determined that the connection is not established, the processing advances to step S1005, where an error message is displayed in the display area 507.

Meanwhile, if it is determined that the connection is properly established in step S1004, the processing advances to step S1006, where a determination is made as to whether the obtained data is web content data. If it is determined that the obtained data is not the web content data, the processing advances to step S1007, where it is determined whether the data is data that can be deployed in the copying machine 101. If it is determined that the data cannot be deployed, the processing advances to step S1005, where an error message is displayed in the display area 507.

On the other hand, if it is determined that the data can be deployed in step S1007, the processing advances to step S1008, where it is determined which of the Print key or the Print Preview key is pressed. If it is determined that the Print Preview key is pressed, the processing advances to step S1009, then the print preview is displayed, and the processing stands by until a next instruction is issued and received. In step S1010, a determination is made as to whether the next instruction is an instruction for printing. If the instruction is the instruction for printing, the processing advances to step S1011, where the printing starts. In addition, if it is determined the Print key is pressed in step S1008, the processing directly advances to step S1011, where the printing starts.

Meanwhile, if it is determined that the obtained data is the web content data in step S1006, the processing advances to step S1012, where the obtained content is displayed in the display area 603. Further, in step S1013, a determination is made as to whether there is an instruction for printing or an instruction for print preview. If it is determined that the print instruction or the print preview instruction is issued, the processing advances to step S1008 to perform the above processing. On the other hand, if it is determined that neither the print instruction nor the print preview instruction is issued, the processing advances to step S1014.

After the error message is displayed in step S1005 or when there is no instruction issued in step S1010, or when the print processing is completed in step S1011, or when there is no print instruction or no print preview instruction is issued, a determination is made as to whether an instruction for a next URL is issued, in step S1014.

If it is determined that the instruction for a next URL is issued, just as in the case of the home URL, the processing returns to step S1004, where it is determined whether the browser can connect to the next URL. Meanwhile, if there is no instruction for a next URL, the processing advances to step S1015, where it is determined whether the instruction is the instruction for ending the processing. If the instruction is the instruction for ending the processing, the processing terminates the web browser.

[Exemplary Method of Registering URL Information]

Figure 22:
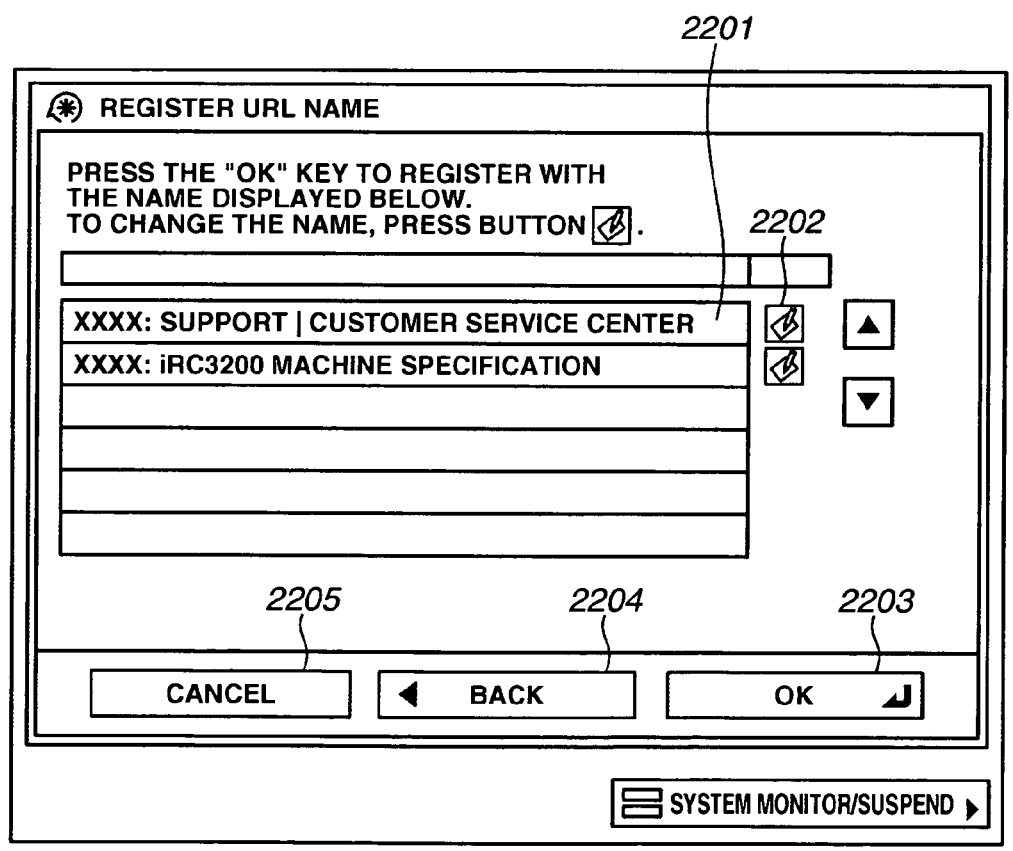
FIG. 22 is a diagram that shows an example of a register URL name display screen of the LCD display unit displayed at the time of registration of a URL.
Figure 23:
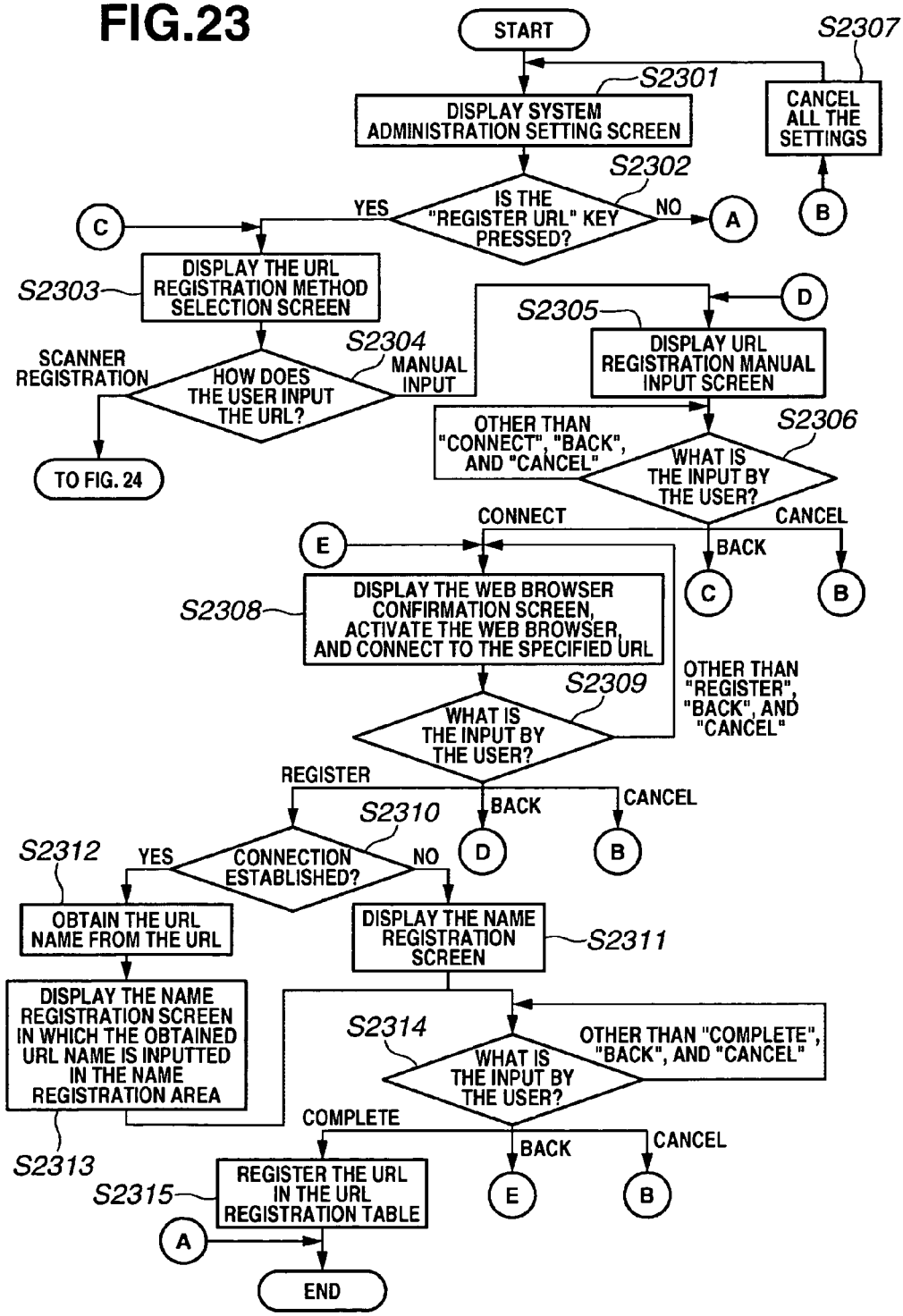
FIG. 23 is a flow chart that shows a flow of an exemplary processing for registering a URL.
Figure 24:
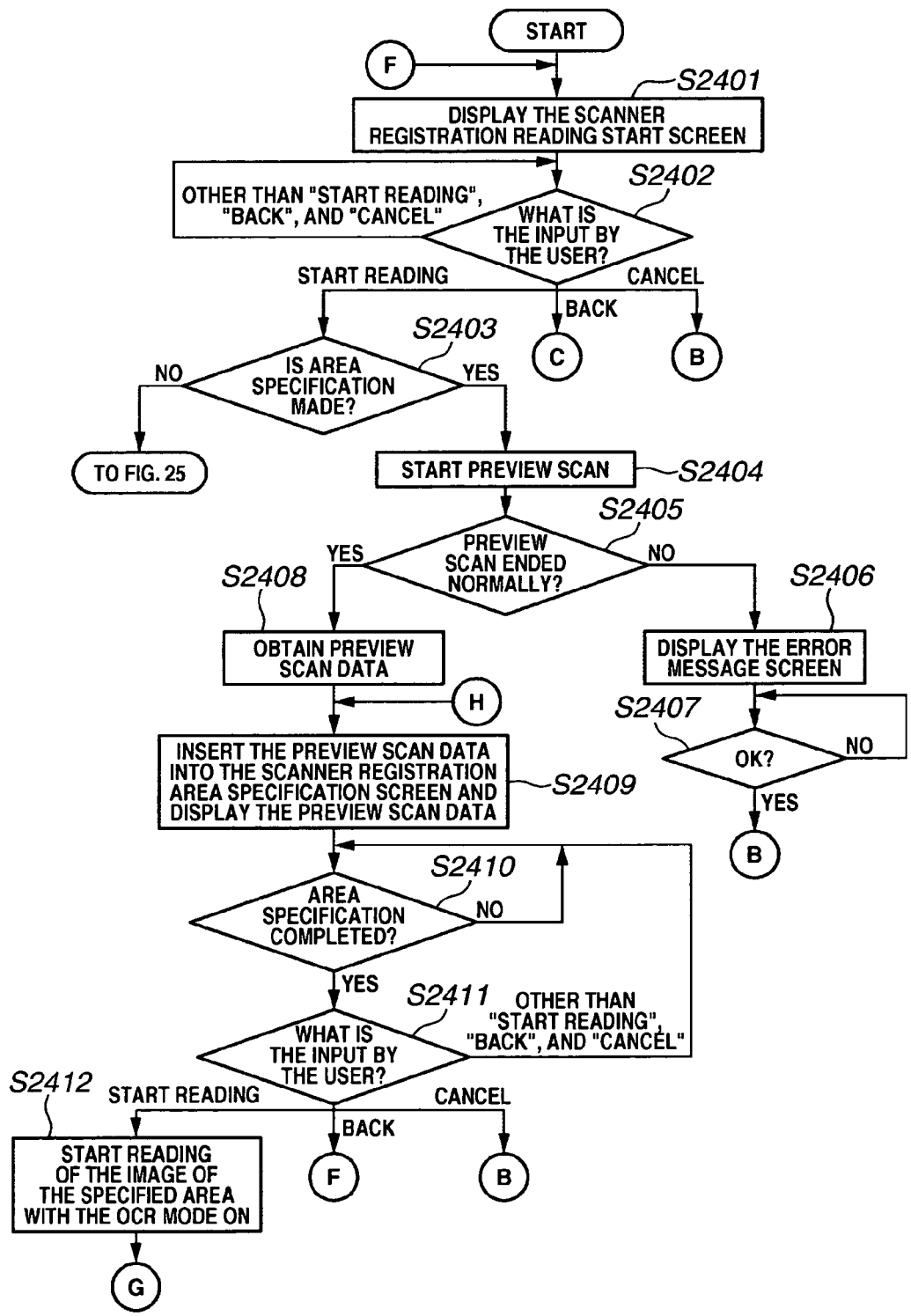
FIG. 24 is a flow chart that shows a flow of an exemplary processing for registering a URL.
Figure 25:
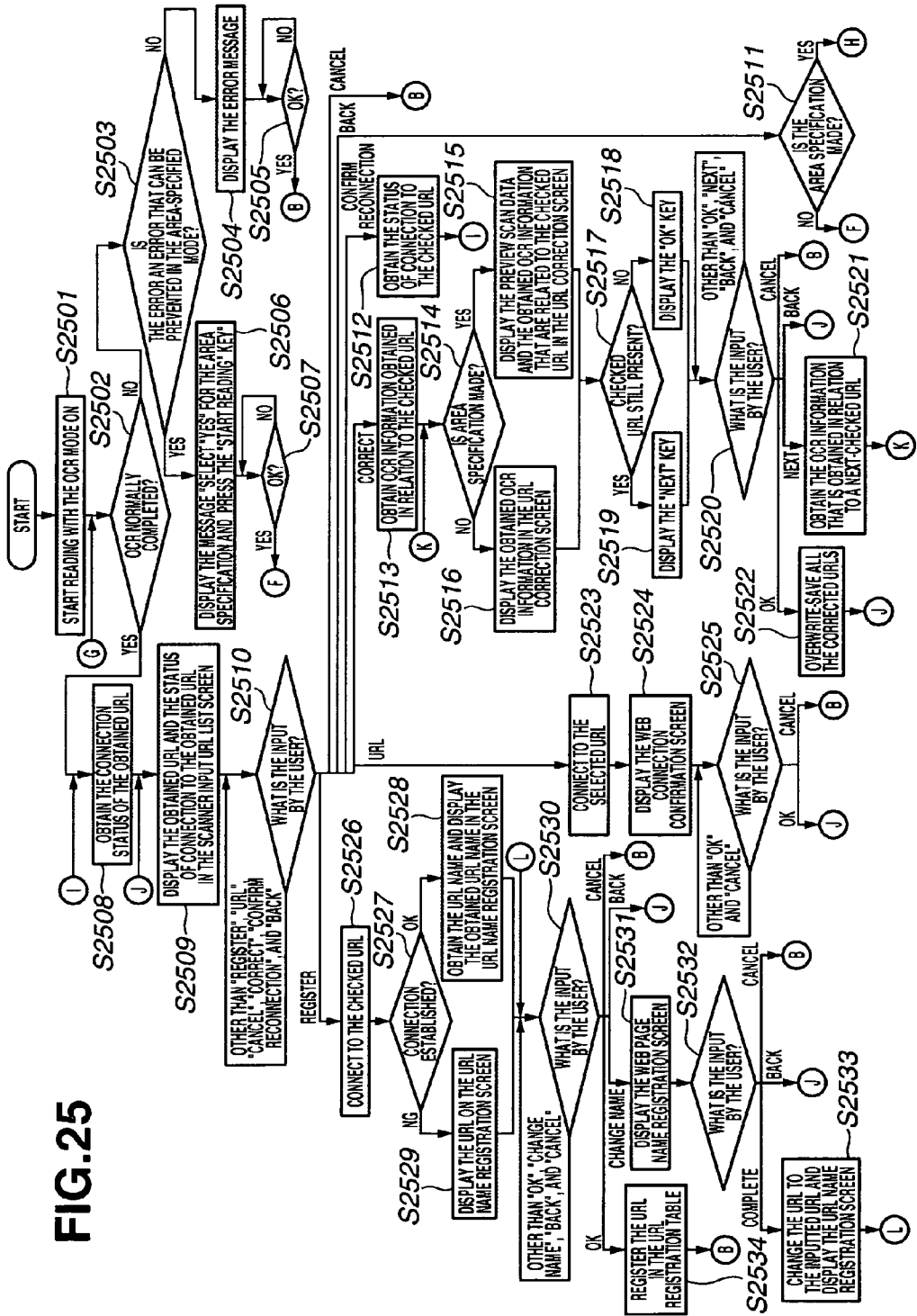
FIG. 25 is a flow chart that shows a flow of an exemplary processing for registering a URL.

Next, an explanation is made as to a method of registering the URL information in the system administration setting, with reference to FIGS. 11 through 25. Each of FIGS. 11 through 23 is a diagram that shows one example of a display screen of the LCD display unit 401 displayed at the time of registration of a URL. While, each of FIGS. 23 through 25 is a flow chart that shows a flow of exemplary processing for registering a URL.

Figure 11:
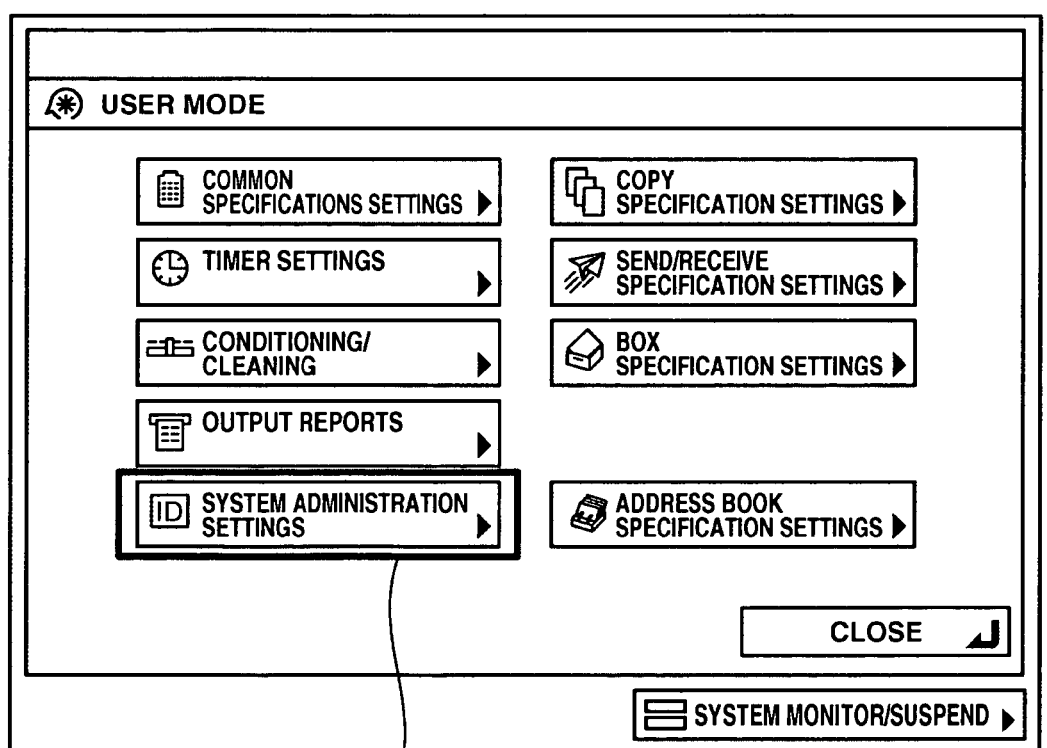
FIG. 11 is a diagram that shows an example of a user mode display screen of the LCD display unit displayed at the time of registration of a URL.
Figure 12:
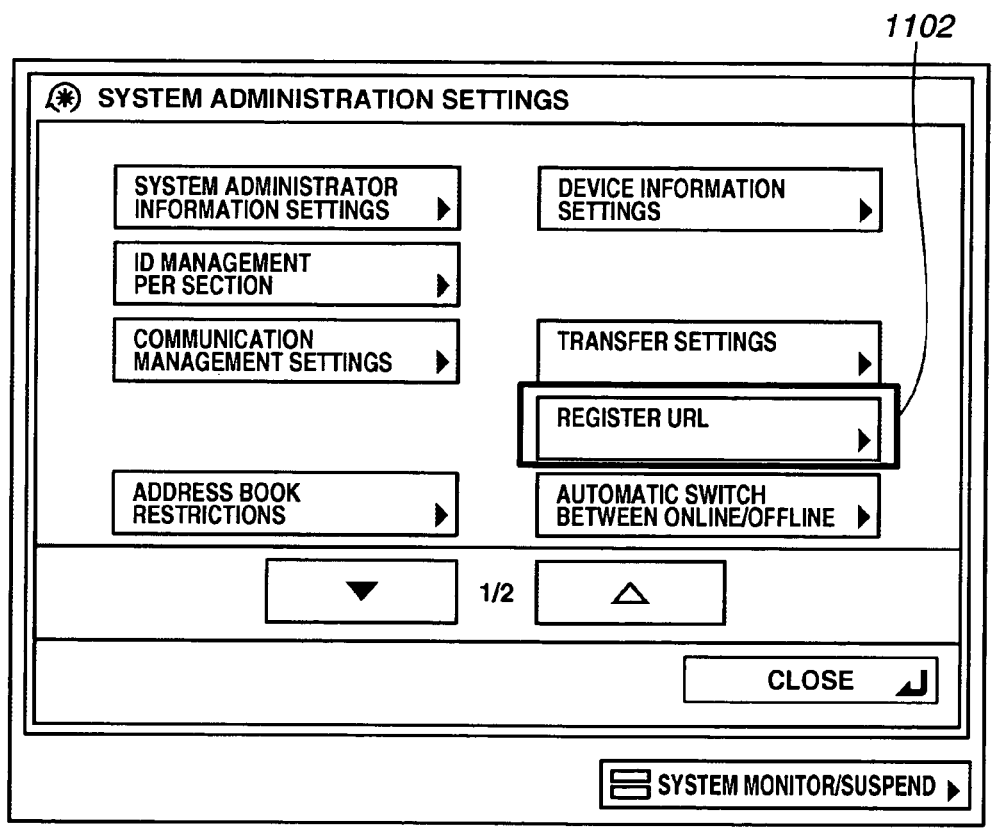
FIG. 12 is a diagram that shows an example of a system administration settings display screen of the LCD display unit displayed at the time of registration of a URL.

The user, in registering the URL, first, presses the User Mode key 402 in the operation unit 293 as shown in FIG. 4. Upon the pressing by the user of the User Mode key 402, the user mode screen as shown in FIG. 11 is displayed. Next, the user presses "System Administration Settings" key 1101. The copying machine 101, upon detection of the pressing of the System Administration Settings key 1101, displays the system administration setting screen as shown in FIG. 12 (step S2301 in FIG. 23). The system administration setting mode is the mode used in performing settings related to various kinds of administration operation. By setting a system administration ID function, it is possible that no person except the administrator can change the setting.

Figure 13:
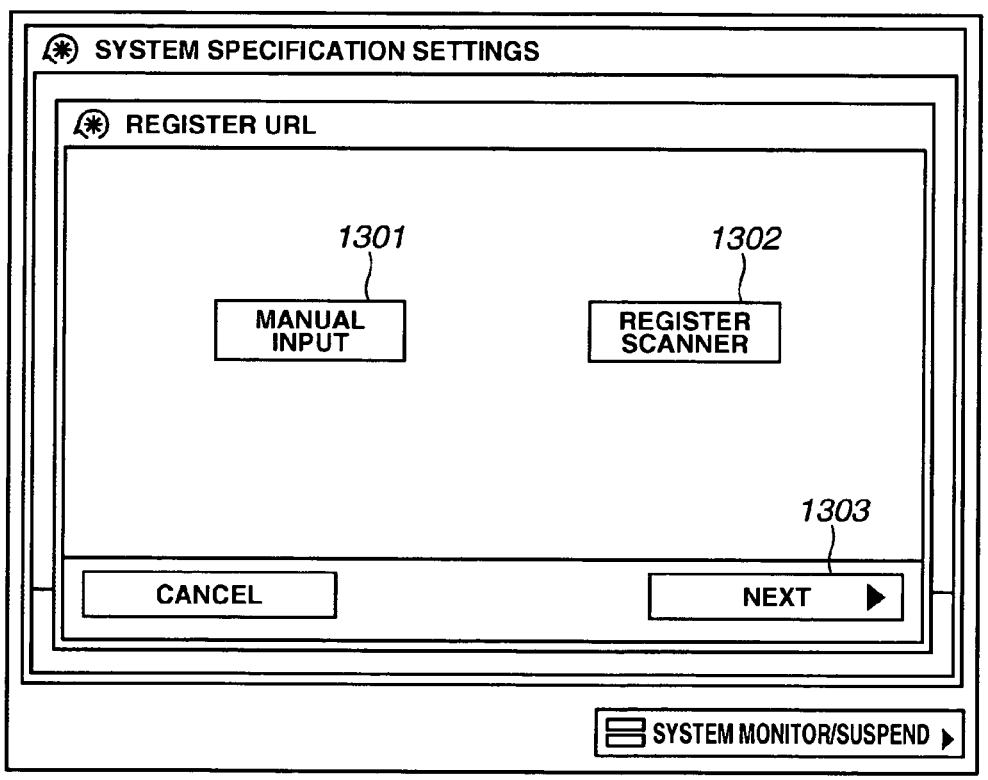
FIG. 13 is a diagram that shows an example of a register URL display screen of the LCD display unit displayed at the time of registration of a URL.

Next, the user presses the URL Registration key 1102 in the system administration setting screen (FIG. 12). Upon detection of pressing of the URL Registration key 1102, the copying machine 101 displays a URL registration method selection screen as shown in FIG. 13 (steps S2302 and S2303 in FIG. 23). Note that in the URL registration selection screen, a "Manual Input" key 1301 and a "Register Scanner" key 1302, are displayed as methods for registering the URL. The URL can be registered by using either of the URL registration methods. Hereinbelow, each of the URL registration methods is explained.

First, the procedure that the user takes in manually registering the URL is explained. When the user manually registers the URL, the user selects the "Manual Input" key 1301 by the URL registration method selection screen as shown in FIG. 13, and then presses a "Next" key 1303. Upon selection of the "Manual Input" key 1301 and the "Next" key 1303, the copying machine 101 determines that the user manually registers the URL, and displays the URL registration manual input screen as shown in FIG. 14 (steps S2304 and 2305 in FIG. 23).

Figure 14:
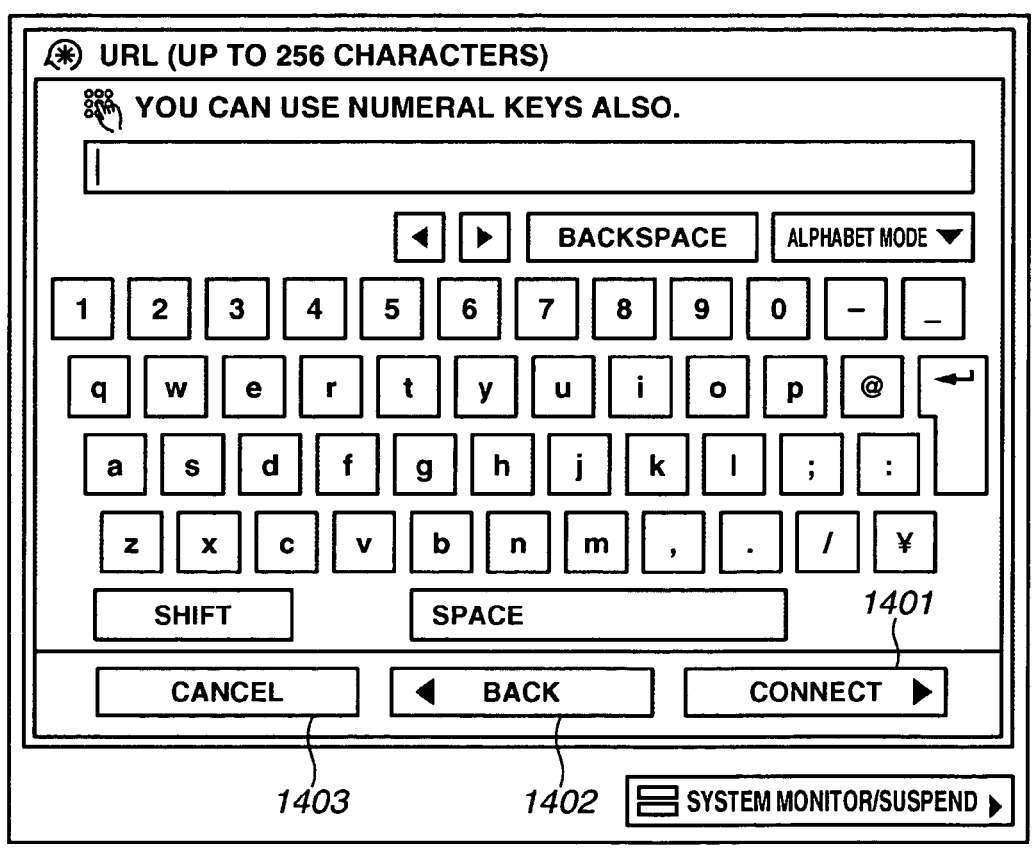
FIG. 14 is a diagram that shows an example of a URL input display screen of the LCD display unit displayed at the time of registration of a URL.

FIG. 14 is a diagram that shows one example of a URL registration manual input screen. In the screen, by using a software keyboard, the user can input character strings. The copying machine 101 receives the input by the user in step S2306. The user can, further, press either of a "Connect" key 1401, "Back" key 1402, and a "Cancel" key 1403. In the copying machine 101, upon pressing of the Cancel key 1403, the processing advances to step S2307, then cancels all the set settings, and then returns to step S2301, and then, displays the system administration setting screen as shown in FIG. 12. If the "Back" key 1402 is pressed, the processing returns to step S2303 and displays the URL registration manual input screen as shown in FIG. 13.

Figure 15:
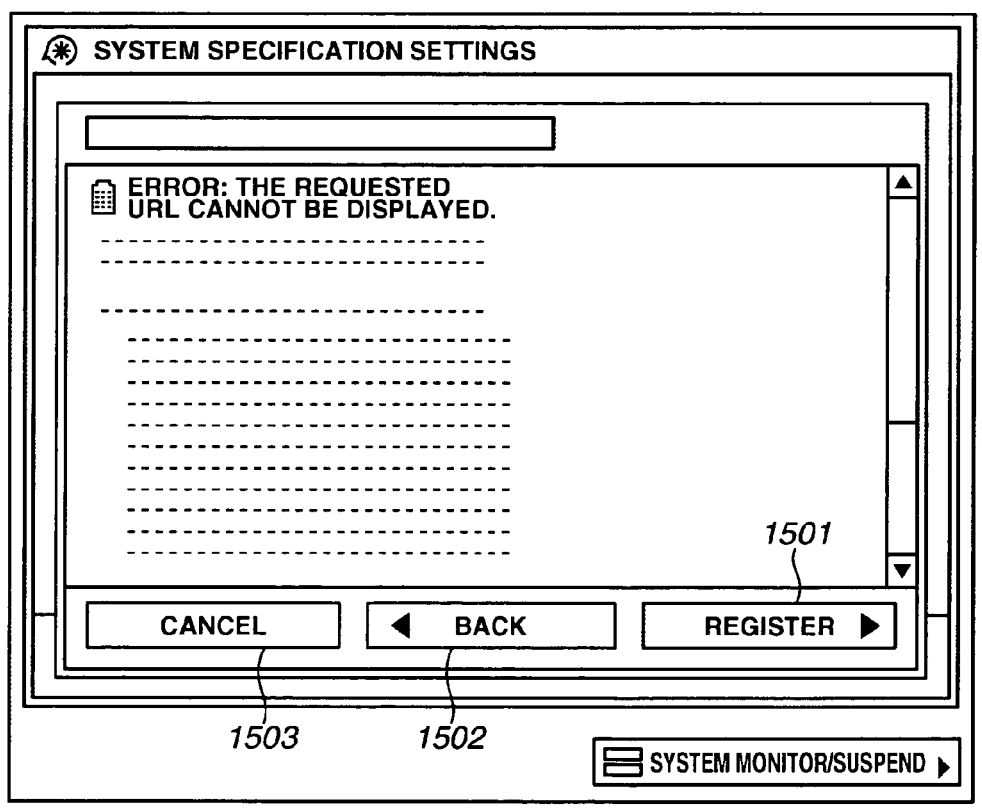
FIG. 15 is a diagram that shows example of an error display screen of the LCD display unit displayed at the time of registration of a URL.

Meanwhile, when the "Connect" key 1401 is pressed, the processing advances to step S2308, and displays the web browser confirmation screen as shown in FIG. 15, and activates the web browser, and then connects to the specified URL. FIG. 15 is a diagram that shows one example of a web browser confirmation screen. If the connection to the specified URL is successfully established, the content thereof is displayed on the web browser confirmation screen. In addition, the user can press either of a "Register" key 1501, a "Back" key 1502, and a "Cancel" key 1503, which are disposed in a lower portion of the screen.

The copying machine 101 determines which of the "Register" key 1501, the "Back" key 1502, and the "Cancel" key 1503 is pressed by the user (step S2309). If it is determined that the "Cancel" key 1503 is pressed, the processing advances to step S2307, then cancels all the set settings, and then returns to step S2301 to display the system management setting screen as shown in FIG. 12. If the "Back" key 1502 is pressed, the processing returns to step S2305, and displays the URL registration manual input screen as shown in FIG. 14.

Figure 16:
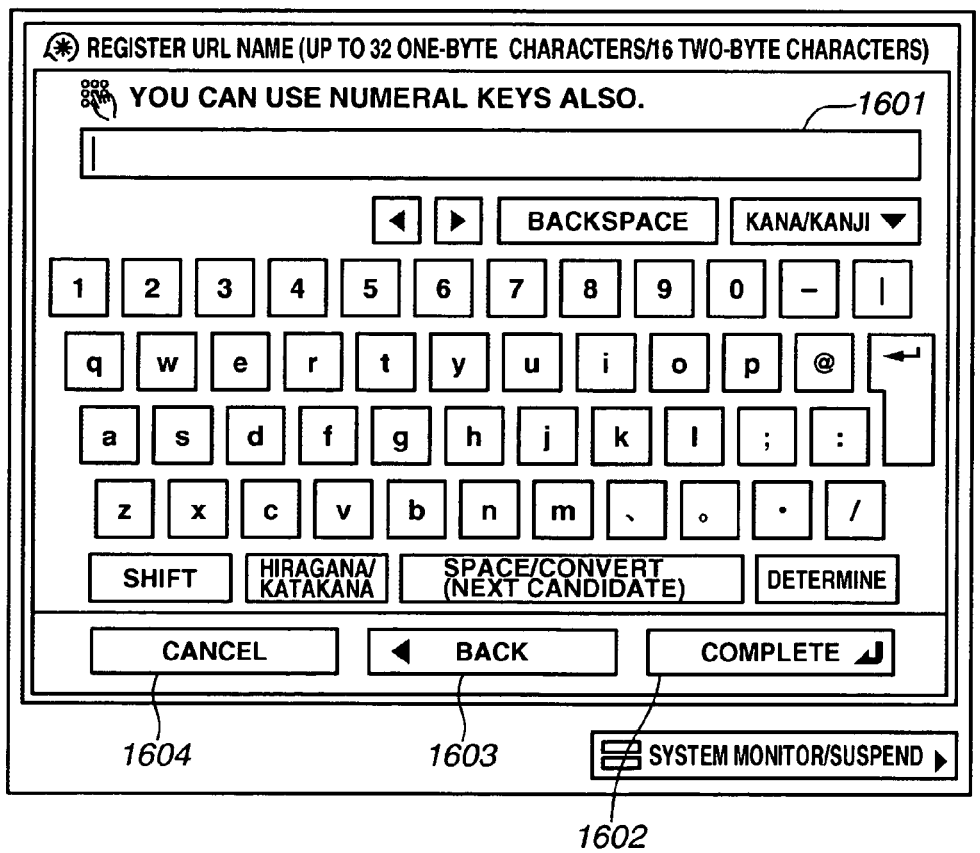
FIG. 16 is a diagram that shows another example of a URL input display screen of the LCD display unit displayed at the time of registration of a URL.

On the other hand, upon pressing of the "Register" key 1501, the copying machine 101 causes the processing to advance to step S2310, and determines whether the connection to the specified URL is successfully established. If the connection is not established, the processing advances to step S2311 and displays the web page name registration screen as shown in FIG. 16. Note, in this case, a name registration area 1601 in the web page name registration screen is in a blank state. On the other hand, if it is determined that the connection is established, the processing advances to step S2312, then obtains the name (the name to be registered to the "Favorite") form the content of the connected URL, and after that, the processing advances to step S2313, and displays the web page name registration screen in a state where the obtained name is input to the name registration area 1601.

In the web page name registration screen as shown in FIG. 16, the user can input a name to be registered into the name registration area by using the software keyboard. Further, the user can press either of a "Complete" key 1602, a "Back key 1603, and a "Cancel" key 1604.

The copying machine 101 determines which of the "Complete" key 1602, the "Back key 1603, and the "Cancel" key 1604 is pressed by the user (step S2314). If it is determined that the "Cancel" key 1604 is pressed, the processing advances to step S2307, then cancels all the set settings, and then returns to step S2301, and then displays the system administration setting screen as shown in FIG. 12. In addition, if the "Back" key 1603 is pressed, the processing returns to step S2308, and displays the web browser confirmation screen. Meanwhile, if the "Complete" key 1602 is pressed, the URL is registered to a URL registration table (step S2315).

Next, the procedure the user takes in registering the URL by using the scanner unit 291 is explained. In registering the URL by using the scanner unit 291, the user selects the "Register Scanner" key 1302 and presses the "Next" key 1303 in the URL registration method selection screen as shown in FIG. 13. Upon selection of the "Register Scanner" key and pressing of the "Next" key 1303, the copying machine 101 determines that the URL is registered by using the scanner unit 291, and displays a scanner registration reading start screen as shown in FIG. 17 (step S2401 in FIG. 24).

Figure 17:
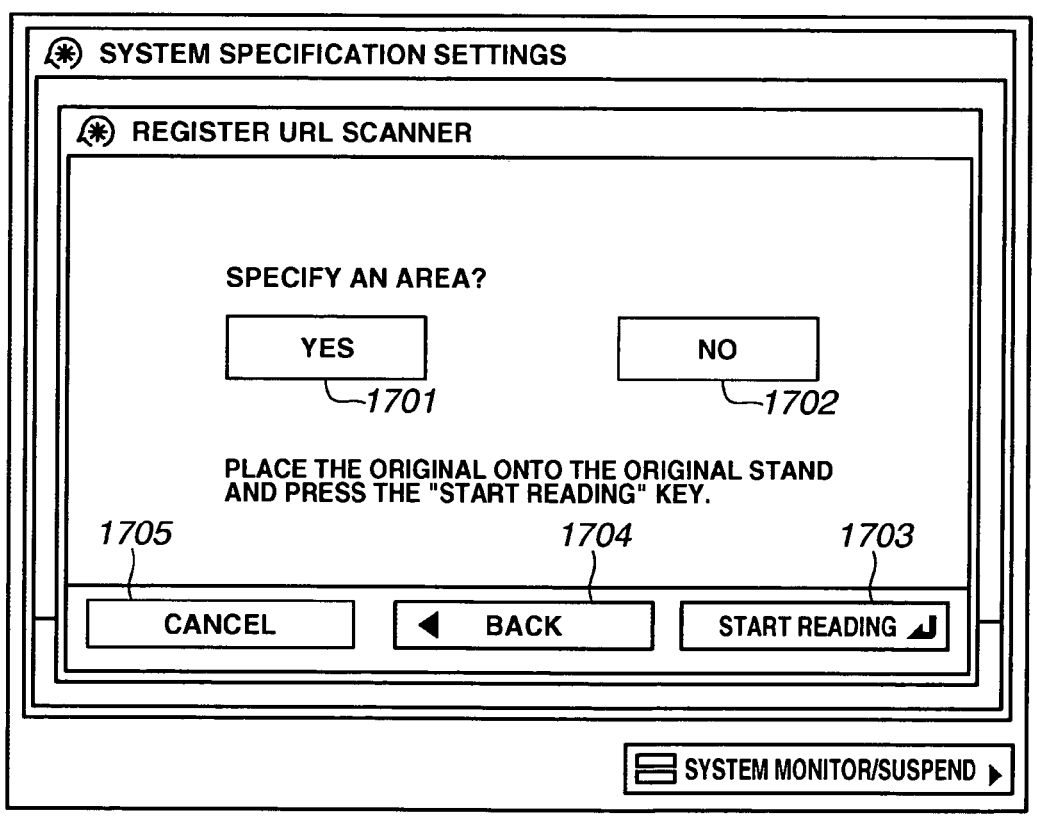
FIG. 17 is a diagram that shows an example of a register URL scanner display screen of the LCD display unit displayed at the time of registration of a URL.

FIG. 17 is a diagram that shows one example of the scanner registration reading start screen. As shown in FIG. 17, in the scanner registration reading start screen, the user can select between a "Yes" key 1701 and a "No" key 1702 for specifying whether an area is specified. In addition, the user can select either of a "Start Reading" key 1703, a "Back" key 1704, and a "Cancel" key 1705. Note that an "Area Specified" mode is a mode for specifying a URL portion in the read image, and a "No Area Specified" mode is a mode for extracting all of the URLs in the read image.

The copying machine 101 determines which of the "Start Reading" key 1703, the "Back" key 1704, and the "Cancel" key 1705 is pressed by the user (step S2402). If it is determined that the "Cancel" key 1705 is pressed, the processing advances to step S2307, then cancels all the set settings, and then returns to step S2301, and then, displays the system administration setting screen as shown in FIG. 12. If the "Back" key 1704 is pressed, the processing returns to step S2303 and displays the URL registration manual input screen as shown in FIG. 13.

Meanwhile, if the "Start Reading" key 1703 is pressed, the processing advances to step S2403, where it is determined whether an area specification is made. The presence or absence of the area specification is determined on the basis of which of the "Yes" key 1701 and the "No" key 1702 is selected when the "Start Reading" key 1703 is pressed. Hereinbelow, the explanation is separately made as to cases where an area is specified and where no area is specified.

In this regard, first, an explanation is made as to a flow of processing in an area specification mode. When the user selects the area "Yes" key 1701 for area specification in the scanner registration reading start screen as shown in FIG. 17 and presses the "Start Reading" key 1703, the copying machine 101 starts scanning for the preview (step S2404).

In step S2405, a determination is made as to whether the preview scan is normally completed. If the preview scan is not completed normally because of shortage of the memory capacity or insufficient compression ratio, or the like, the processing advances to step S2406 and displays an error screen (not shown). If the user presses the "OK" key in the error screen ("Yes" in step S2407), the processing advances to step S2307, then cancels all the set settings, and then returns to step S2301 to display the system administration setting screen as shown in FIG. 12.

On the other hand, if the preview scan is normally completed, the processing advances to step S2408 and obtains preview scan data. Further, in step S2409, the obtained preview scan data is inserted into a scanner registration area specification screen as shown in FIG. 18 to display the same.

Figure 18:
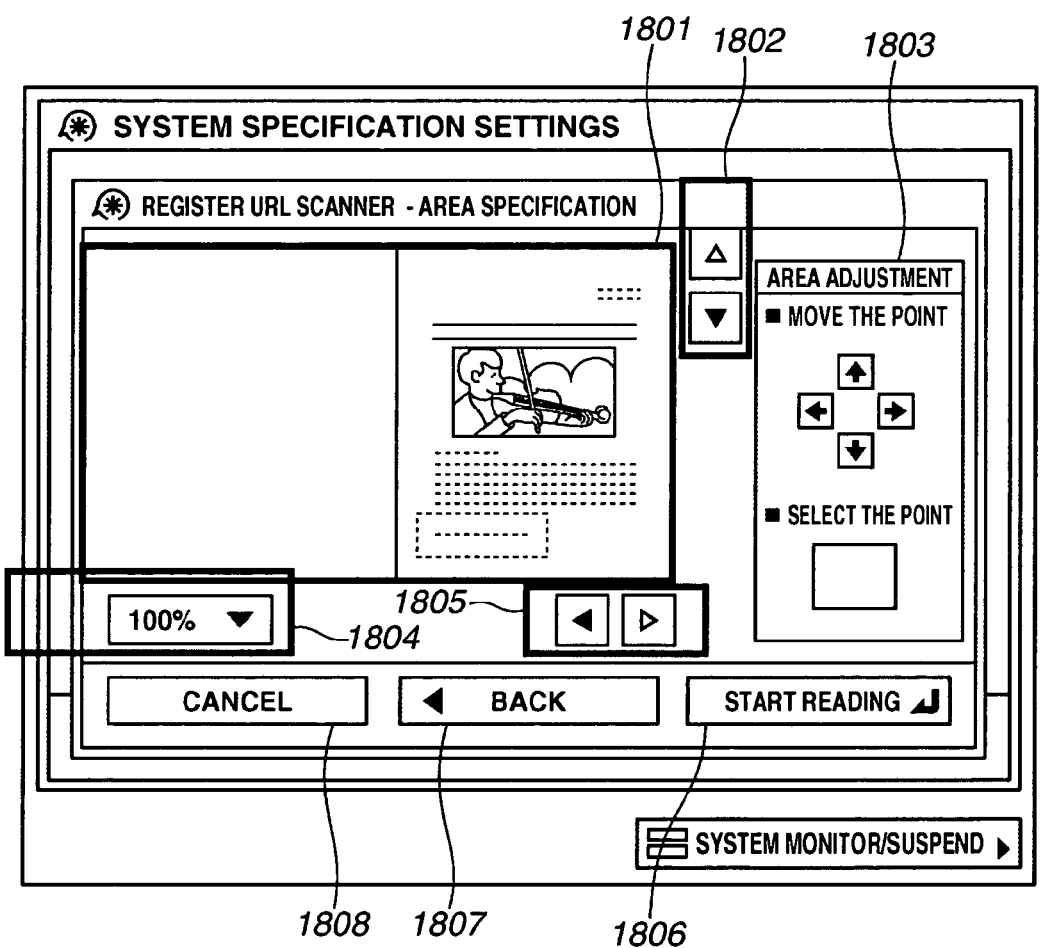
FIG. 18 is a diagram that shows an example of area specification features of a display screen of the LCD display unit displayed at the time of registration of a URL.

FIG. 18 is a diagram that shows one example of the scanner registration area specification screen. Reference numeral 1801 denotes a display area of the preview scan data. Reference numerals 1802 and 1805 respectively denote scroll keys used in moving the display screen vertically or horizontally. Reference numeral 1803 denotes a group of area adjustment keys. The area adjustment keys 1803 are used in slightly adjusting the area specified by a touch pen in the preview scan data display area 1801. Reference numeral 1804 denotes a zoom key, which is used for magnifying the preview scan data displayed in the preview scan data display area. Further, reference numerals 1806 through 1808 respectively denote a "Start Reading" key, a "Back" key, and a "Cancel" key.

When the user completely performs the area specification in the scanner registration area specification screen as shown in FIG. 18 ("Yes" in step S2410), the copying machine 101 determines which of the "Start Reading" key 1806, a "Back" key 1807, and a "Cancel" key 1808 is pressed by the user (step S2411). If it is determined that the "Cancel" key 1808 is pressed, the processing advances to step S2307, then cancels all the set settings, and then returns to step S2301, and then, displays the system administration setting screen as shown in FIG. 12. If the "Back" key 1807 is pressed, the processing returns to step S2401 and displays the scanner registration reading start screen as shown in FIG. 17.

Meanwhile, if it is determined that the "Start Reading" key 1806 is pressed in step S2411, the processing advances to step S2412. In step S2412, the processing allows an OCR mode to be turned on in the specified area and starts reading an image. After reading the image in step S2412, the processing advances to step S2502 in FIG. 25.

Next, an explanation is made as to a flow of processing in a no-area specification mode. When the user selects the "No" key 1702 for area specification in the scanner registration reading start screen as shown in FIG. 17 and presses the "Start Reading" key 1703, the processing advances to step S2501 and starts reading an images, with turning the OCR mode on with respect to each of the images. After the image is read in step S2501, the processing advances to step S2502.

Next, an explanation is made as to a flow of processing performed after the image reading is started with the OCR mode turned on in when an area is specified and when no area is specified. In step S2502, a determination is made as to whether the image reading by the OCR is successfully done. If it is determined that the image reading by the OCR is not successfully completed in step S2502, the processing advances to step S2503 and determines whether the error that is the cause thereof is an error that can be prevented in the area specification mode.

If it is determined that the error cannot be prevented in step S2503, the processing advances to step S2504 and displays an error message (not shown). When the user presses the "OK" key in the error message screen ("Yes" in step S2505), the processing advances to step S2307 in FIG. 23, then cancels all the set settings, and then returns to step S2301, and then, displays the system administration setting screen as shown in FIG. 12.

Meanwhile, if it is determined that the error can be prevented in the area specification mode, the processing advances to step S2506, and displays a message "Specify the Area and Press the "Start Reading" Key." (not shown). If the user presses the "OK" key in response to the message ("Yes" in step S2507), the processing returns to step S2401 in FIG. 24, and displays the scanner registration reading start screen as shown in FIG. 17.

On the other hand, in step S2505, if it is determined that the image reading by the OCR is successfully done, the processing advances to step S2508 and obtains a status of connection by accessing to the extracted URL. In step S2509, the URL extracted by the OCR and the connection status thereof are displayed in a registered scanner URL list screen as shown in FIG. 19.

Figure 19:
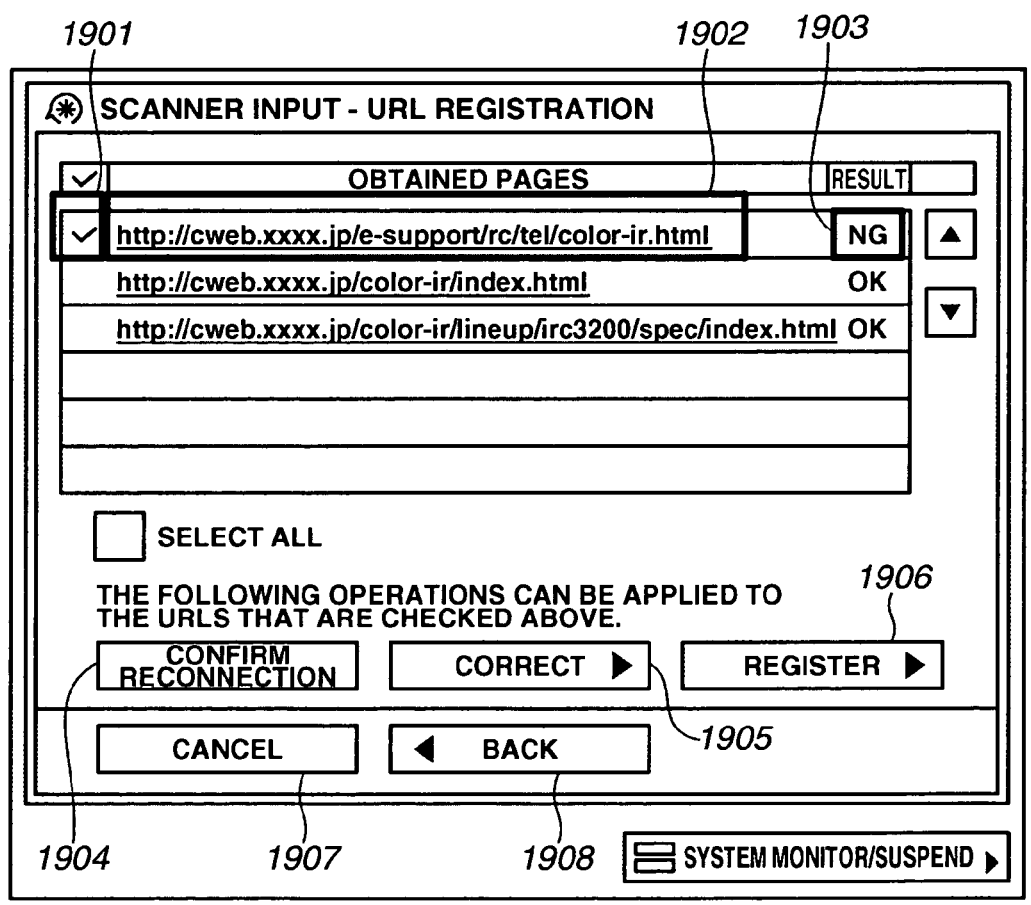
FIG. 19 is a diagram that shows an example of an obtained pages display screen of the LCD display unit displayed at the time of registration of a URL.

Here, the registered scanner URL list screen as shown in FIG. 19 is explained. Reference numeral 1901 denotes a URL check box. With respect to a URL with the URL check box 1901 checked by the user, reconnection confirmation, correction, and registration are performed. Reference numeral 1902 denotes an extracted URL display area. Reference numeral 1903 denotes a message as to a result of connection that displays the connection status obtained in step S2508 in FIG. 25 with respect to each URL that is displayed in the extracted URL display area 1902.

When there is one or more URLs that are checked in the URL check box 1901, a "Confirm Reconnection" key 1904, a "Correct" key 1905, and a "Register" key 1906 can be pressed. In addition, the user can press a "Cancel" key 1907, a "Back" key 1908, and a desired portion of the URL display area 1902. In step S2510, which of the keys is pressed in the registered scanner URL list screen as shown in FIG. 19. If it is determined that the "Cancel" key 1907 is pressed, the processing advances to step S2307, then cancels all the set settings, and then returns to step S2301, and then, displays the system administration setting screen as shown in FIG. 12.

If it is determined that the "Back" key 1908 is pressed, the processing advances to step S2511, and then determines whether there is present an area specification. If the area specification is performed, the processing returns to step S2409 in FIG. 24 and displays the scanner registration area specification screen as shown in FIG. 18. On the other hand, if no area is specified, the processing returns to step S2401 in FIG. 24 and displays the scanner registration reading start screen as shown in FIG. 17.

Meanwhile, if it is determined that either of the "Confirm Reconnection" key 1904, the "Correct" key 1905, the "Register" key 1906, and the URL display area 1902 is pressed, in each of the cases, respectively, the processing advances to steps S2512, S2513, S2526, or S2523, respectively. Hereinbelow, the processing for each case is explained.

If it is determined that the "Confirm Reconnection" key 1904 is pressed, the processing advances to step S2512, then reconnects to the URL checked by using the URL check box 1901, and then obtains the connection status. After that, the processing returns to step S2508, and updates the connection result 1903 as shown in FIG. 19, in accordance with the obtained connection status.

If it is determined that the "Correct" key 1905 is pressed in step S2510, the processing advances to step S2513, and obtains OCR information extracted in relation to the checked URL. Next, in step S2514, the processing checks whether the area specification mode is set to be on. If it is determined that the area specification mode is set to be on in step S2514, the processing advances to step S2515, and displays the preview scan data of the checked URL and the obtained OCR information on a URL correction screen as shown in FIG. 20.

Figure 20:
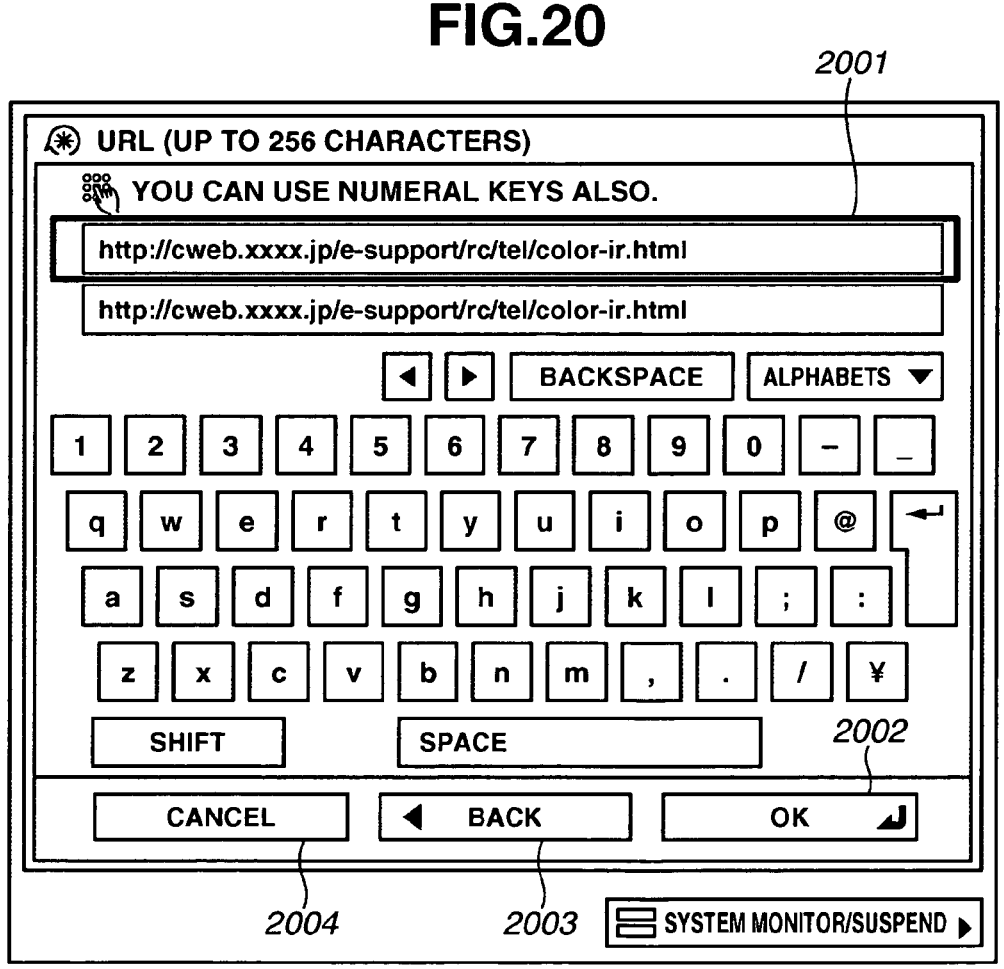
FIG. 20 is a diagram that shows another example of a URL input display screen of the LCD display unit displayed at the time of registration of a URL.

Meanwhile, if it is determined that the area specification mode is set to be off, the obtained OCR information is displayed in the URL correction screen as shown in FIG. 20 (step S2516). Here, the URL correction screen as shown in FIG. 20 is explained. Reference numeral 2001 denotes a display area for displaying the OCR information. Reference numerals 2002 through 2004 respectively denote an "OK" key, a "Back" key, and a "Cancel" key. Note that if there is any other URL that is checked in the URL check box 1901 as shown in FIG. 19, the "OK" key 2002 as shown in FIG. 20 is turned into a "Next" key.

The copying machine 101 determines whether there is another URL that is checked in step S2517, and if it is determined that there is such another URL, the processing advances to step S2519, and displays the "Next" key. If, on the other hand, it is determined that there is no such URL, the processing advances to step S2518 and displays the "OK" key.

In step S2520, a determination is made as to which of the keys in the URL correction screen as shown in FIG. 20 is pressed by the user. If it is determined that the "Cancel" key 2004 is pressed, the processing advances to step S2307, then cancels all the set settings, and then returns to step S2301, and then, displays the system administration setting screen as shown in FIG. 12. In addition, if it is determined that the "Back" key 2003 is pressed, the processing returns to step S2509 and displays the registered scanner URL list screen as shown in FIG. 19. Further, if it is determined that the "Next" key 2002 is pressed, the processing advances to step S2521, then obtains the OCR information obtained in relation to the URL that is subsequently checked, and after that, returns to step S2514.

Figure 21:
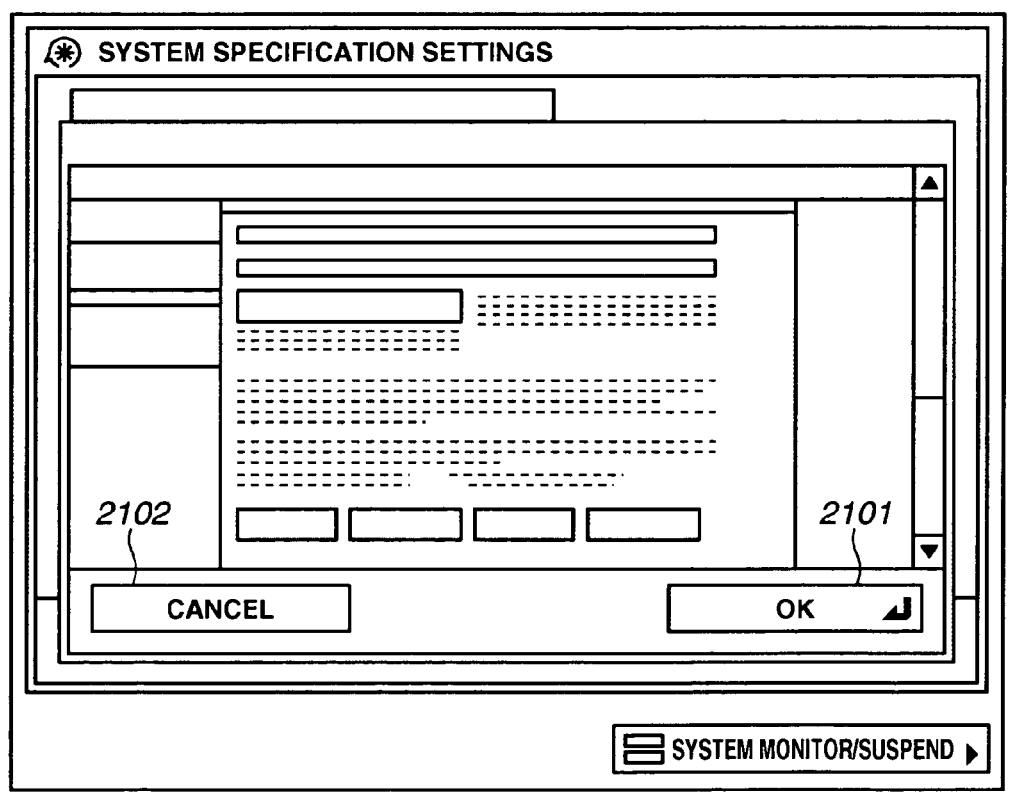
FIG. 21 is a diagram that shows another example of a display screen of the LCD display unit displayed at the time of registration of a URL.

On the other hand, if the "OK" key 2002 is pressed, the processing advances to step S2522, and overwrite-stores all the corrected URLs to the URL registration table, then returns to step S2509, and again obtains the connection status. If it is determined that the URL display area 1902 is pressed, the processing advances to step S2523, and connects to the selected URL. Further, regardless of whether any of the URL check box 1901 as shown in FIG. 19 is checked, when the URL display area 1902 is pressed, a web display screen as shown in FIG. 21 is opened (step S2524). Thus, the user can confirm whether the read URL is the desired URL.

In the web display screen as shown in FIG. 21, the user can press an "OK" key 2101 and a "Cancel" key 2102. In step S2525, the copying machine 101 determines which of the keys is pressed. If in step S2525 it is determined that the "OK" key 2101 is pressed, the processing returns to step S2509. On the other hand, if it is determined that the "Cancel" key 2102 is pressed, the processing advances to step S2307, then cancels all the set settings, and then returns to step S2301, and then, displays the system administration setting screen as shown in FIG. 12.

If it is determined that the "Register" key 1906 is pressed in step S2510, the processing advances to step S2526, and connects to the checked URL. In step S2527, whether the connection is successfully established or not is determined. If it is determined that the connection to the checked URL is successfully established, the processing advances to step S2528, then obtains a URL name, and displays the obtained URL name in a URL name registration screen as shown in FIG. 22. On the other hand, if it is determined that the connection is not established, the processing advances to step S2529, and displays the URL in the URL name registration screen.

Here, the URL name registration screen as shown in FIG. 22 is explained. Reference numeral 2201 denotes a name display area. If it is determined that the connection is not established in step S2527, the URL is, displayed in the name display area 2201. On the other hand, if it is determined that the connection is successfully established, the obtained URL name is displayed in the name display area 2201.

Reference numeral 2202 denotes a "Change Name" key that is used in editing the name. For other keys, reference numerals 2203 through 2205 respectively denote an "OK" key, a "Back" key, and a "Cancel" key. In step S2530, which of the keys is pressed by the user is determined. If it is determined that the "Cancel" key 2204 is pressed, the processing advances to step S2307, then cancels all the set settings, and then returns to step S2301, and then, displays the system administration setting screen as shown in FIG. 12. In addition, if it is determined that the "Back" key 2203 is pressed, the processing returns to step S2509 and displays the scanner input URL list screen as shown in FIG. 19.

On the other hand, if it is determined that the "Change Name" key 2202 is pressed, the processing advances to step S2531, and displays the web page name registration screen as shown in FIG. 16. Further, in step S2532, a determination is made as to which of the keys is pressed by the user in the web page name registration screen as shown in FIG. 16. If it is determined that the "Cancel" key 1604 is pressed, the processing advances to step S2307, then cancels all the set settings, and then returns to step S2301, and then, displays the system administration setting screen as shown in FIG. 12. If it is determined that the "Back" key 1603 is pressed in the web page name registration screen, the processing returns to step S2509 and displays the registered scanner URL list screen as shown in FIG. 19. Further, if it is determined that the "Complete" key 1602 is pressed, the processing advances to step S2533, then change the URL to the input URL, and displays the URL name in the registration screen, and then returns to step S2530.

If in step S2530 it is determined that the "OK" key 2203 is pressed, the processing advances to step S2534, then registers the URL to the URL registration table. After that, the processing advances to step S2307, then cancels all the set settings, and then returns to step S2301, and then, displays the system administration setting screen as shown in FIG. 12.

The copying machine 101 according to this embodiment, if there is a URL that is not alive as a result of confirmation of aliveness (whether there is a linkrot or whether the URL is changed) of the URL registration information, outputs a report of the URL information of the URL that is determined to be not alive, and thus the user can instruct a handling (whether such URL is erased or updated) of the URL. In addition, in the copying machine 101, the report of the instruction for handling instructed by the user is read by the scanner, and the URL registration information is deleted or updated based on the content of the instruction. Thus, the user can select and register the desired URL registration information.

Hereinbelow, an explanation is made as to an automatic check on whether there is a linkrot with respect to the registered URL information or whether there is a change in the URL and also as to a method of updating the registered content based on the result of the checking.

Figure 26:
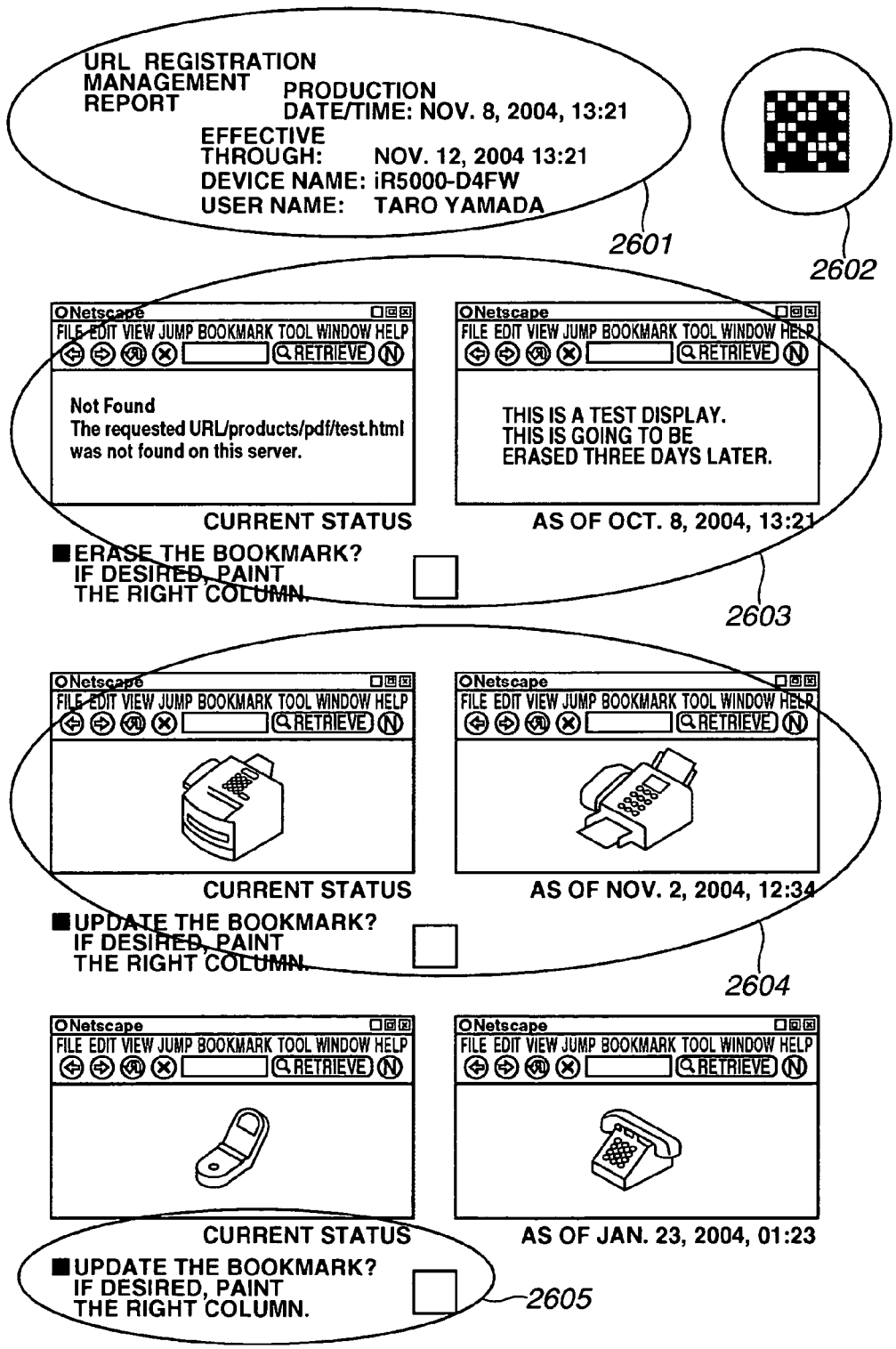
FIG. 26 is a diagram that shows one example of a report to be output.

FIG. 26 is a diagram that shows one example of the report outputted in the automatic check described later below. In FIG. 26, reference numeral 2601 denotes a portion in which a title of the report and a date and time of outputting the report, an effective period (last date and time of the effectiveness of the report) in the case of updating the URL registration information by using the report, a device name for identifying the device that outputs the report, and a user name of a user who outputs the report are printed thereon.

Note that as described later, in updating the URL information registered to the copying machine 101 that is the source of distribution by using the report, it is necessary to read the report sheet from the scanner unit 291. Therefore, two-dimensional bar code information is printed onto a portion 2602 at the same time, so that the content printed in the report can be uniquely identified.

Reference numeral 2603 denotes an example of a printed output in a case where the object to be displayed is erased from a location of storage specified by the registered URL during a time period from the time of URL registration to the time the report is outputted. Reference numeral 2604 denotes an example of a printed output in a case where the location of storage of the object to be displayed is changed from the location of storage specified by the registered URL and the URL jumps to the changed destination. Reference numeral 2605 denotes a check box for allowing the user to instruct processing related to an update of the URL registration information of the copying machine in relation to the result of the outputted report.

Figure 27:
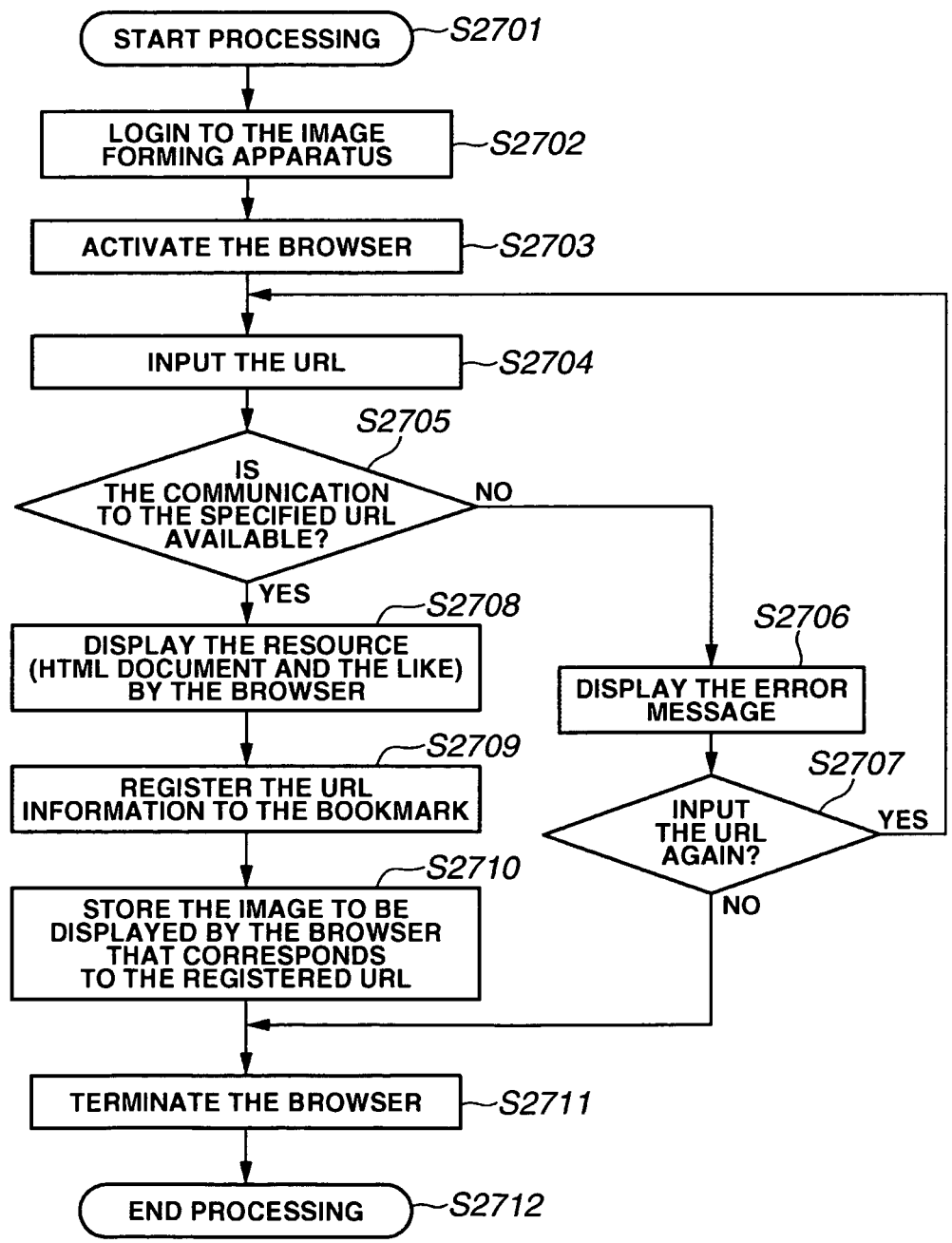
FIG. 27 is a flow chart that shows a flow of an exemplary processing for storing an image displayed by the web browser at the time of URL registration.

FIG. 27 is a flow chart that shows a flow of exemplary processing for accumulating an images displayed by the web browser at the time of registration of the URL. The images that are accumulated by the processing are printed at the time of outputting the report (see FIG. 26). When the processing starts in step S2701, then in step S2702, processing for a log-in to the copying machine 101 by using a user ID and a password is accepted.

Note that in the case where the setting for managing the users is not made in the copying machine 101, the log-in processing is not performed. In addition, for the log-in processing, there are various types of methods that use an IC card and the like, in addition to the method in which the input is made through the operation unit 293. However, the explanation thereof is omitted here.

In step S2703, the web browser is activated. Note that the details of the activation are as described above. In step S2704, the URL information is input through the operation screen of the web browser. Note that the input of the URL information may be the input based on the result of the reading from the scanner unit 291, as described above. In step S2705, a determination is made as to whether a communication is available with respect to the input URL and whether the data to be displayed is present.

If the communication is not established and the web browser cannot display the content of the URL, the processing shifts to step S2706, and displays a message on the LCD display unit 401, indicating the content of the error such that the communication is not established as to the URL destination, that there is no data to be displayed in relation to the specified URL, or that the data exists but the data cannot be displayed.

In step S2707, the user selects whether the URL specification is to be made again. If the user specifies the URL again, the processing returns to the URL input in step S2704. If the user does not specify the URL again, the processing shifts to step S2711 and terminates the web browser. If the communication to the specified URL destination is normally established and the data is the data of a format that can be displayed by the web browser, object data is displayed in step S2708. Note that a format that can be displayed by the web browser is dependent on the web browser.

After that, when the "Favorite" key is pressed by the user and the instruction for registering the URL information to the "Favorite" key is received, the copying machine 101 registers the URL information to the URL registration table (step S2709). In step S2710, a display image at the time of the URL registration, that is, the display image in a state where the data of the URL destination is normally displayed by the web browser, is stored in a non-volatile memory installed within the device together with the registered URL information. When the series of operations are complete, the processing shifts to step S2711 to terminate the web browser. Then, in step S2712, the processing ends.

Note that here, the explanation is made as to a case where the URL registration information is registered by pressing the "Favorite" key. However, the method of registration is not limited to this. That is, the same image accumulation processing can also be performed by registering the URL registration information by selecting the user mode and pressing the system administration setting key 1101.

Figure 28:
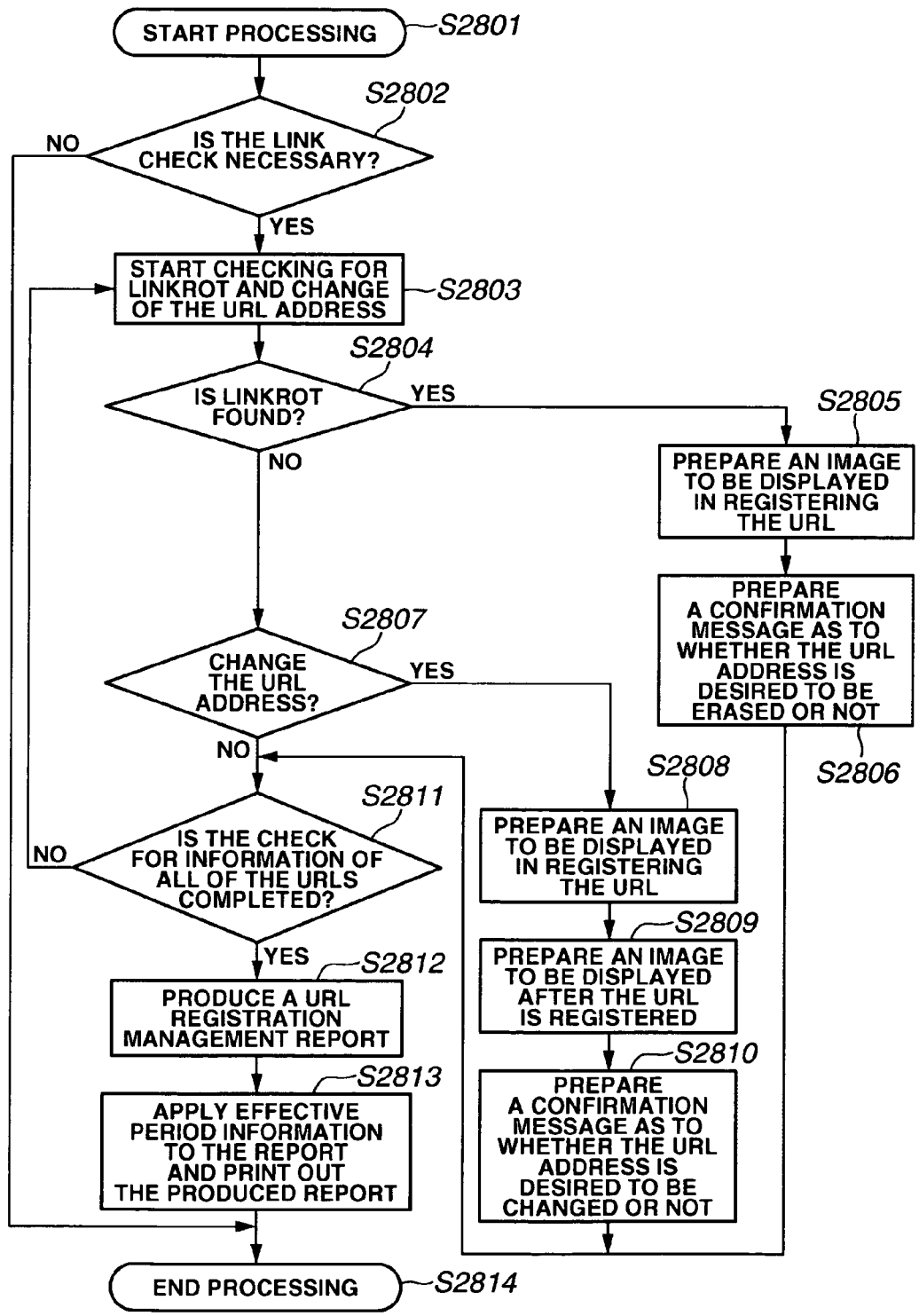
FIG. 28 is a flow chart that shows a flow of an exemplary processing for outputting the report.

FIG. 28 is a flow chart that shows a flow of exemplary processing for outputting the report as shown in FIG. 26. When the processing starts in step S2801, then in step S2802, a determination is made as to whether it is necessary to check for a linkrot with respect to the URL information. As for the determination as to whether it is necessary to check for the linkrot, although not shown, there is a method, for example, in which the determination is made based on presence or absence of an arbitrary operation for instruction of start of the check by the user, and also, there is a method in which the copying machine 101 automatically determines based on the time and the interval (schedule of checking) that the user previously sets.

If it is not necessary to check for the linkrot, the processing shifts to step S2814 and the processing ends. On the other hand, if it is determined that the check for the linkrot is necessary, the processing shifts to step S2803 to start the check for the linkrot or the change of the URL address in relation to the registered URL.

In step S 2804, whether the communication between the registered URL is available, that is, whether the link is not alive is determined. If it is determined that the link is not alive, the processing shifts to step S2805. With respect to the determination as to the aliveness of the link, there may be a case where a server apparatus in which the information of the destination of the URL is out of order or where the URL actually exists but the access to the data of the URL destination is not available only while the checking is just being performed due to a problem or a trouble in the course of the communication path. Therefore, although not explained here, the processing may be configured such that the processing shifts to step S2805 only when the linkrot is continuously found after a predetermined number of times of checking is properly performed.

In step S2805, the display image that has been displayed by the web browser at the time of the URL registration is prepared. Then, in step S2806, a message for confirming the user of whether the URL address is erased from URL registration information is prepared. That is, the content to be printed denoted by reference numeral 2603 in FIG. 26 is prepared. If it is determined that the link is not dead, the processing shifts to step S2807, where it is determined whether the registered URL address has been changed.

For the method of determining whether there has been a change in the URL, for example, there is a method in which, if tag information of an html document of the link destination specifies <meta http-equiv="Refresh"content="10; URL=http://www.abc.def.com/"> (automatically jump to www.abc.def.com in ten seconds), it is determined that there has been a change in the URL address.

If it is determined that there has been a change in the URL address, the processing shifts to step S2807. In step 2808, the display image that has been displayed by the web browser at the time of the URL registration is prepared, and in step S2809, the display image after the URL address is changed is prepared.

In step S2810, a message for confirming whether the URL address of the URL registered as the URL registration information is permitted to be changed is prepared. That is, the content to be printed denoted by reference numeral 2604 in FIG. 26 is prepared. If in step S2807 no change in the URL address is detected, the processing shifts to step S2811 and determines whether the check is completed with respect to all the URL registration information to be checked which is registered as the URL registration information. If the check is not completed, the processing shifts to step S2803. If the check is completed, the processing shifts to step S2812.

In step S2812, an image of the report as shown in FIG. 26 is produced, In step S2813, information on the effective period and the like of the report in reading the report from the scanner unit 291 of the copying machine 101 is added, and the resulting report is outputted.

Note that a method of determining the effective period is not explained by showing in a drawing. However, there is a method, for example, in which an arbitrary period continued until an output of the next report is applied, if a periodical check of the URL registration is set. Alternatively, a time period that the user previously sets may be employed. After the report is outputted in step S2813, the processing shifts to step S2814 and the processing ends.

Figure 29:
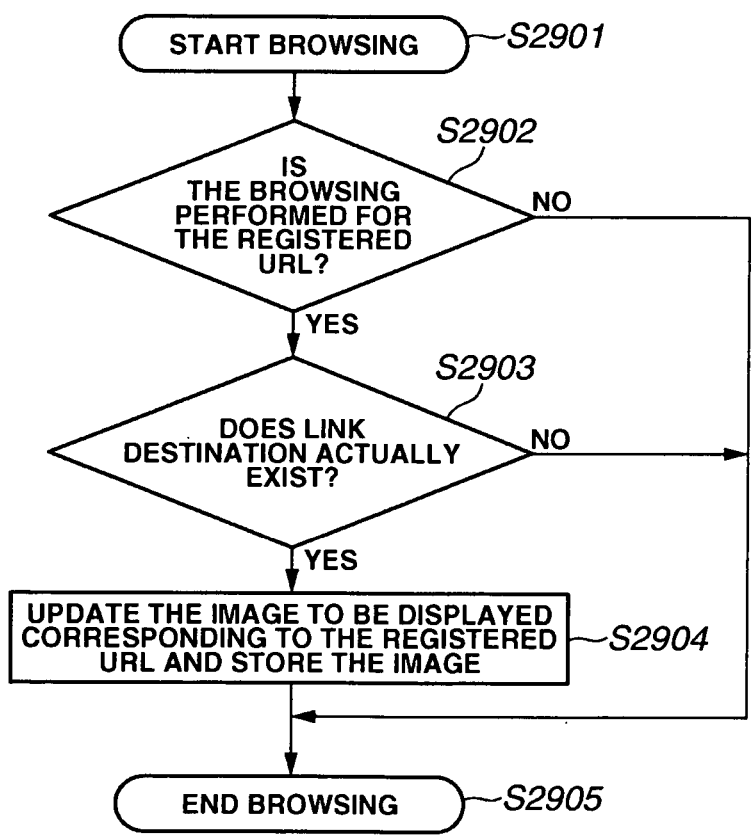
FIG. 29 is a flow chart that shows a flow of an exemplary processing for updating an image stored in correspondence with the URL.

FIG. 29 is a flow chart that shows a flow of exemplary processing for updating the image stored in correspondence with the URL, which is indicated by step S2710 in FIG. 27. When a browsing starts in step S2901, then, in step S2902, whether a registered URL is browsed or not is determined. The determination as to whether the URL is a registered URL is made based on whether the registered URL is directly specified or on whether the character string used in inputting the URL in the URL input screen and the registered URL information are matched with each other.

If it is determined that the URL is not the registered URL, the browsing terminates in step S2905. On the other hand, if the registered URL is browsed, the processing shifts to step S2903. In step S2903, whether the link destination exists or not is determined. If there exists no link destination, the processing shifts to step S2905. If there exists the link destination, the processing shifts to step S2904. In step S2904, information on the image that is currently being displayed and is already stored together with the registered URL is updated and stored. After the updating is completed, the processing shifts to step S2905, and the processing ends.

FIG. 30 is a diagram that shows one example of a result of a marking made by the user in outputting the report as shown in FIG. 26, in order to read the report from the scanner unit 291 to update URL registration information. In this example, marking is made to each portion denoted by reference numerals 3001 and 3002. Accordingly, if the report is read by the scanner unit 291, the URL registration information corresponding to the portion 3001 is erased, and the URL registration information corresponding to the portion 3002 is updated with respect to the URL.

Figure 31:
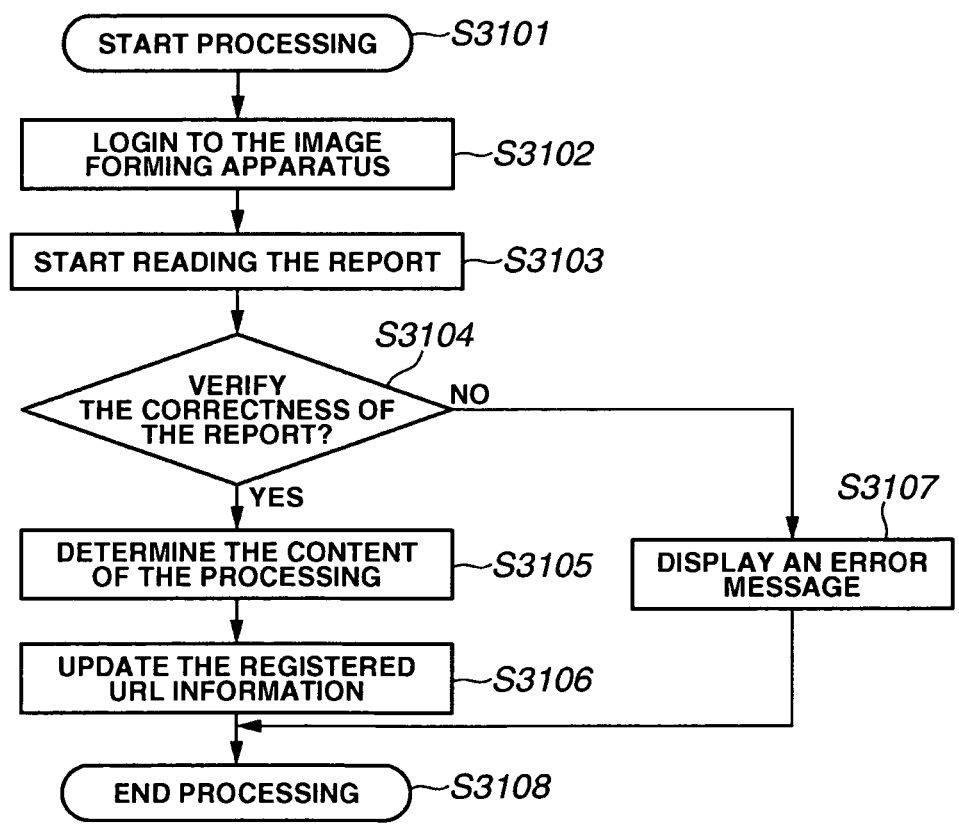
FIG. 31 is a flow chart that shows a flow of an exemplary processing for reading the report that has been instructed (marked) by the user and updating the registered URL information.

FIG. 31 is a flow chart that shows a flow of exemplary processing for reading the report that has been instructed (marked) by the user and updating the registered URL information. When the processing for reading the report by the scanner unit 291 starts in step S3101, then in step S3102, the log-in processing for logging in to the copying machine 101 by using a user ID and a password is accepted.

Note that in the case where the setting for managing the users is not made in the copying machine 101, the log-in processing is not performed. In addition, for the log-in processing, there are various types of methods that use an IC card and the like, in addition to the method in which the input is made through the operation unit 293. However, the explanation thereof is omitted here.

In step S3103, the outputted report that is already marked is read by using the operation unit 293 in step S3103. In step S3104, the read report is subjected to the processing for a determination as to the authenticity. The content of the determination includes, based on the two-dimensional bar codes printed onto the report, whether the effective period of the report has elapsed, whether the copying machine that has outputted the report and the copying machine that has read the report are physically the same device, whether the user information of the user who has logged in to the copying machine is the same as the user information that is described in the report are matched with each other, whether, the number of times of outputting the report and the number of copies of the marked report read this time are matched with each other, for example.

If the authenticity of the read report cannot be verified, an error message is displayed by the LCD display unit 401 in step S3107. After that, the processing shifts to step S3108, and then the processing ends. On the other hand, if the authenticity is verified, the processing shifts to step S3105. In step S3105, the content of the processing performed to the registered URL information is determined such as an erasure of the registered URL information, updating of the registered URL information to a new URL, or no processing, based on the marking made on the report. In step S3106, based on the content of processing determined in step S3105, the registered URL information is updated.

As is apparent form the above description, according to this embodiment, the URL registration information of the browser installed to the copying machine can always be maintained to be updated and effective information.

Other Exemplary Embodiments, Features and Aspects of the Present Invention

Note that the present invention may be applied to a system configured by a plurality of devices (for example, a host computer, an interface device, a reader, a printer, and the like), or may be applied to an apparatus configured by a single device (for example, a copying machine, a facsimile apparatus, and the like).

The present invention can also be achieved by providing the system or the device with a storage medium which records program code of software implementing the function of the embodiment and by reading and executing the program code stored in the storage medium with a computer of the system or the device (the CPU or the MPU). In this case, the program code itself, which is read from the storage medium, implements the function of the embodiment mentioned above, and accordingly, the storage medium storing the program code constitutes the present invention. For the storage medium for supplying such program code, a floppy disk, a hard disk, an optical disk, a magneto-optical disk, a CD-ROM (compact disk-read-only memory), a CD-R (CD-recordable), a magnetic tape, a nonvolatile memory card, a ROM, and the like can be used.

In addition, the function according to the embodiments described above is implemented not only by executing the program code read by the computer, but also implemented by the processing in which an OS (operating system) or the like carries out a part of or the whole of the actual processing on the basis of the instruction given by the program code.

Further, in another aspect of the embodiment of the present invention, after the program code read from the storage medium is written in a function enhancing board inserted in the computer or a memory which is provided in a function enhancing unit connected to the computer, the CPU and the like provided in the function enhancing board or the function enhancing unit carries out a part of or the whole of the processing to implement the function of the embodiment as described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-115908 filed Apr. 13, 2005, which is hereby incorporated by reference herein in its entirety.

What is claimed is:

1. An image forming apparatus, comprising:
a memory;
an obtaining unit configured to obtain a web page identified by a uniform resource identifier (URI) that is input;
a printer configured to print a web page that is obtained by the obtaining unit;
a storage unit configured to store the input URI and the obtained web page corresponding to the input URI;
a determination unit configured to determine, by accessing the URI stored in the storage unit, whether the URI identifying the web page has been changed;
an acquisition unit configured to acquire a web page that is identified by a changed URI;
a print controlling unit configured to control the printer to print a report in response to the determination unit determining that the URI identifying the web page has been changed, wherein described in the printed report are the web page that is identified by the URI which is before changing and is stored in the storage unit, the web page that is identified by the changed URI and is acquired by the acquisition unit, and information for instructing whether the URI stored in the storage unit which is before changing is to be changed to the changed URI;
a scanner configured to scan the report printed by the printer in response to the determination unit determining that the URI identifying the web page has been changed;
a change unit configured to change the URI stored in the storage unit in accordance with the information in the report scanned by the scanner; and
a second determination unit configured to determine an authenticity of the report that is scanned by the scanner,
wherein the change unit allows the changing of the URI to be executed in response to the second determination unit determining that the report is authentic,
wherein the second determination unit is configured to make a determination as to the authenticity of the report by making a determination on at least one of whether an effective period of the report scanned by the scanner has not yet elapsed, whether a user who logs into the image forming apparatus and a user described in the report are identified to be a same person, and whether a number of copies of the report printed by the printer is a same as a number of copies of the report scanned by the scanner, and
wherein the obtaining unit, the determination unit, the acquisition unit, the print controlling unit, the second determination unit, and the change unit are stored in the memory.

2. The image forming apparatus according to claim 1, further comprising:
a display unit configured to display the web page that is obtained by the obtaining unit,
wherein the print controlling unit controls the printer to print the report in which the web page displayed by the display unit is described.

3. An information processing method performed in an image forming apparatus, the information processing method comprising:
obtaining a web page identified by a uniform resource identifier (URI) that is input, wherein an obtained web page is configured to be printed by a printer of the image forming apparatus;
storing the input URI and the obtained web page corresponding to the input URI;
determining, by accessing the stored URI, whether the URI identifying the web page has been changed;
acquiring a web page that is identified by a changed URI;
controlling the printer to print a report in response to determining that the URI identifying the web page has been changed, wherein described in the printed report are the web page that is identified by the URI which is before changing and is stored, the web page that is identified by the changed URI and is acquired, and information for instructing whether the stored URI which is before changing is to be changed to the changed URI;
scanning the report printed by the printer in response to determining that the URI identifying the web page has been changed;
changing the stored URI in accordance with the information in the scanned report; and determining an authenticity of the report that is scanned,
wherein changing includes allowing the changing of the URI to be executed in response to determining that the report is authentic,
wherein determining includes making a determination as to the authenticity of the report by making a determination on at least one of whether an effective period of the scanned report has not yet elapsed, whether a user who logs into the image forming apparatus and a user described in the report are identified to be a same person, and whether a number of copies of the report printed by the printer is a same as a number of copies of the scanned report.

4. A non-transitory computer readable storage medium storing a program to cause an image forming apparatus to perform the method according to claim 3.

5. An image forming apparatus, comprising:
a memory;
an obtaining unit configured to obtain a web page identified by a uniform resource identifier (URI) that is input;
a printer configured to print a web page that is obtained by the obtaining unit;

a storage unit configured to store the input URI and the obtained web page corresponding to the input URI;

a determination unit configured to determine, by accessing the URI stored in the storage unit, whether a web page identified by the URI exists;

a print controlling unit configured to control the printer to print a report in response to the determination unit determining that the web page identified by a selected URI does not exist, wherein described in the printed report are the web page that is identified by the URI which is before erasing and is stored in the storage unit, information indicating that the URI has been erased, and information for erasing the URI which is before erasing and is stored in the storage unit;

a scanner configured to scan the report printed by the printer in response to the determination unit determining that the web page identified by the selected URI does not exist;

an erasing unit configured to erase the URI stored in the storage unit in accordance with the information in the report scanned by the scanner; and a second determination unit configured to determine an authenticity of the report that is scanned by the scanner, wherein the erasing unit allows the erasing of the URI to be executed in response to the second determination unit determining that the report is authentic, wherein the second determination unit is configured to make a determination as to the authenticity of the report by making a determination on at least one of whether an effective period of the report scanned by the scanner has not yet elapsed, whether a user who logs into the image forming apparatus and a user described in the report are identified to be a same person, and whether a number of copies of the report printed by the printer is a same as a number of copies of the report scanned by the scanner, and wherein the obtaining unit, the determination unit, the print controlling unit, the second determination unit, and the erasing unit are stored in the memory.

6. An information processing method performed in an image forming apparatus, the information processing method comprising:

obtaining a web page identified by a uniform resource identifier (URI) that is input, wherein an obtained web page is configured to be printed by a printer of the image forming apparatus;

storing the input URI and the obtained web page corresponding to the input URI;

determining, by accessing the stored URI, whether a web page identified by the URI exists;

controlling the printer to print a report in response to determining that the web page identified by a selected URI does not exist, wherein described in the printed report are the web page that is identified by the URI which is before erasing and is stored, information indicating that the URI has been erased, and information for erasing the URI which is before erasing and is stored;

scanning the report printed by the printer in response to determining that the web page identified by the selected URI does not exist;

erasing the stored URI in accordance with the information in the scanned report; and determining an authenticity of the report that is scanned, wherein erasing includes allowing the erasing of the URI to be executed in response to determining that the report is authentic, wherein determining includes making a determination as to the authenticity of the report by making a determination on at least one of whether an effective period of the scanned report has not yet elapsed, whether a user who logs into the image forming apparatus and a user described in the report are identified to be a same person, and whether a number of copies of the report printed by the printer is a same as a number of copies of the scanned report.

7. A non-transitory computer readable storage medium storing a program to cause an image forming apparatus to perform the method according to claim 6.

* * * * *